US 7,886,064 B2

(12) United States Patent
Nomura et al.

(10) Patent No.: US 7,886,064 B2
(45) Date of Patent: Feb. 8, 2011

(54) PROGRAM, INFORMATION PROCESSING METHOD AND DEVICE

(75) Inventors: Takashi Nomura, Tokyo (JP); Hiroyuki Tominaga, Kanagawa (JP); Haruhiko Sakata, Kanagawa (JP); Masayuki Takahashi, Tokyo (JP); Kei Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1735 days.

(21) Appl. No.: 10/490,207

(22) PCT Filed: Jul. 30, 2003

(86) PCT No.: PCT/JP03/09631

§ 371 (c)(1),
(2), (4) Date: Mar. 29, 2004

(87) PCT Pub. No.: WO2004/012087

PCT Pub. Date: Feb. 5, 2004

(65) Prior Publication Data

US 2004/0255031 A1    Dec. 16, 2004

(30) Foreign Application Priority Data

Jul. 30, 2002   (JP)   .............................. 2002-221129
Sep. 6, 2002    (JP)   .............................. 2002-260805

(51) Int. Cl.
*G06F 15/16*   (2006.01)
(52) U.S. Cl. .................................... 709/229; 709/225
(58) Field of Classification Search ................. 709/204, 709/205, 206, 225, 226, 229
See application file for complete search history.

(56) References Cited

U.S. PATENT DOCUMENTS

| 6,430,407 | B1 * | 8/2002 | Turtiainen | 455/411 |
| 6,636,733 | B1 * | 10/2003 | Helferich | 455/412.2 |
| 6,654,801 | B2 * | 11/2003 | Mann et al. | 709/224 |
| 6,898,618 | B1 * | 5/2005 | Slaughter et al. | 709/203 |
| 7,062,253 | B2 * | 6/2006 | Money et al. | 455/406 |
| 7,069,344 | B2 * | 6/2006 | Carolan et al. | 709/250 |
| 7,174,564 | B1 * | 2/2007 | Weatherspoon et al. | 726/2 |
| 7,225,156 | B2 * | 5/2007 | Fisher et al. | 705/50 |
| 7,231,517 | B1 * | 6/2007 | Mashayekhi | 713/167 |

FOREIGN PATENT DOCUMENTS

| JP | 2001-313666 | 11/2001 |
| JP | 2001-344200 | 12/2001 |
| JP | 2002-007296 | 1/2002 |

\* cited by examiner

*Primary Examiner*—Saleh Najjar
*Assistant Examiner*—Marie Georges Henry
(74) *Attorney, Agent, or Firm*—Oblon, Spivak, McClelland, Maier & Neustadt, L.L.P.

(57) ABSTRACT

The present invention relates to a program and an information processing method and apparatus with which a connection can be formed reliably between apparatuses having different capabilities. An application #1, using a presence function, announces a profile space ID representing processing for a service that can be provided. An application #n receives the announcement. The application #n requests the application #1 for detailed information of the service and registration to the service. The application #n connects to the application #1 by peer to peer, based on a URI needed for peer-to-peer access, transmitted from the application #1. The present invention can be applied to personal computers, network-enabled CE devices, and commercial application servers on the Internet.

16 Claims, 20 Drawing Sheets

FIG. 8

- PROFILE SPACE ID = 10000001
- PARAMETERS
  - access method, bit rate, X scale, Y scale, audio codec
  - access method {1:RTSP/TCP+RTP/UDP, 2:HTTP tunnelling}
  - bit rate {6k~512kbps}
  - X scale {128~352}
  - Y scale {96~288}
  - Video Codec {1:MPEG4}
  - audio codec {0:none, 1:CELP 8k, 2:CELP 16k, 3:AAC 16k, 4:AAC 32k, 5:AAC 44.1k, 6:AAC 48k}

FIG. 9

- PROFILE DESCRIPTION
  - PROFILE SPACE ID= 10000001
  - access method {1:RTSP/TCP+RTP/UDP, 2:HTTP tunnelling}
  - bit rate {6k~128kbps}
  - X scale {160}
  - Y scale {120}
  - audio codec {0:none, 1:CELP 8k}

FIG. 10

- PROFILE ATOM DESCRIPTION
  - PROFILE SPACE ID= 10000001
  - access method {2:HTTP tunnelling}
  - bit rate {48kbps}
  - X scale {160}
  - Y scale {120}
  - audio codec {1:CELP 8k}

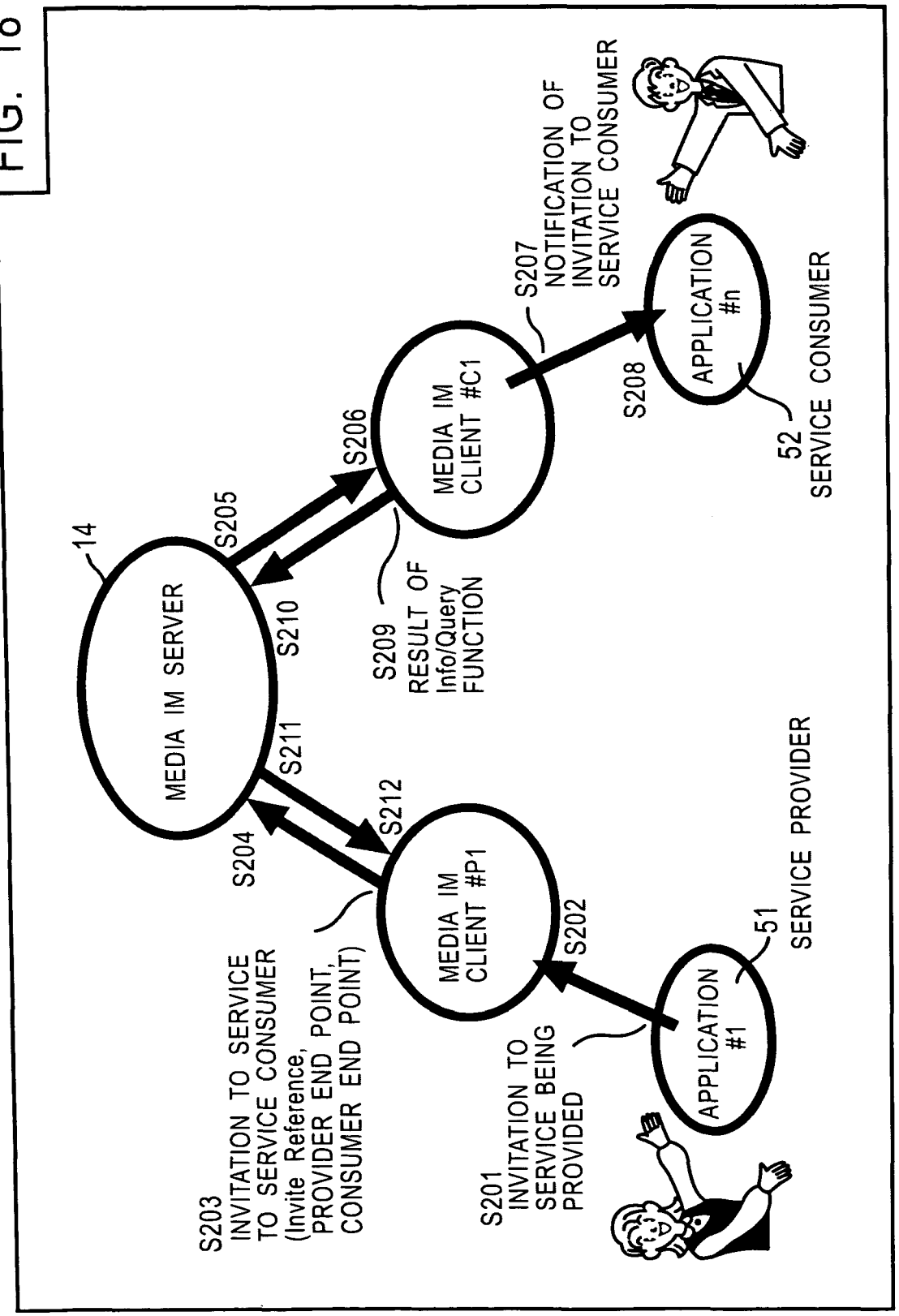

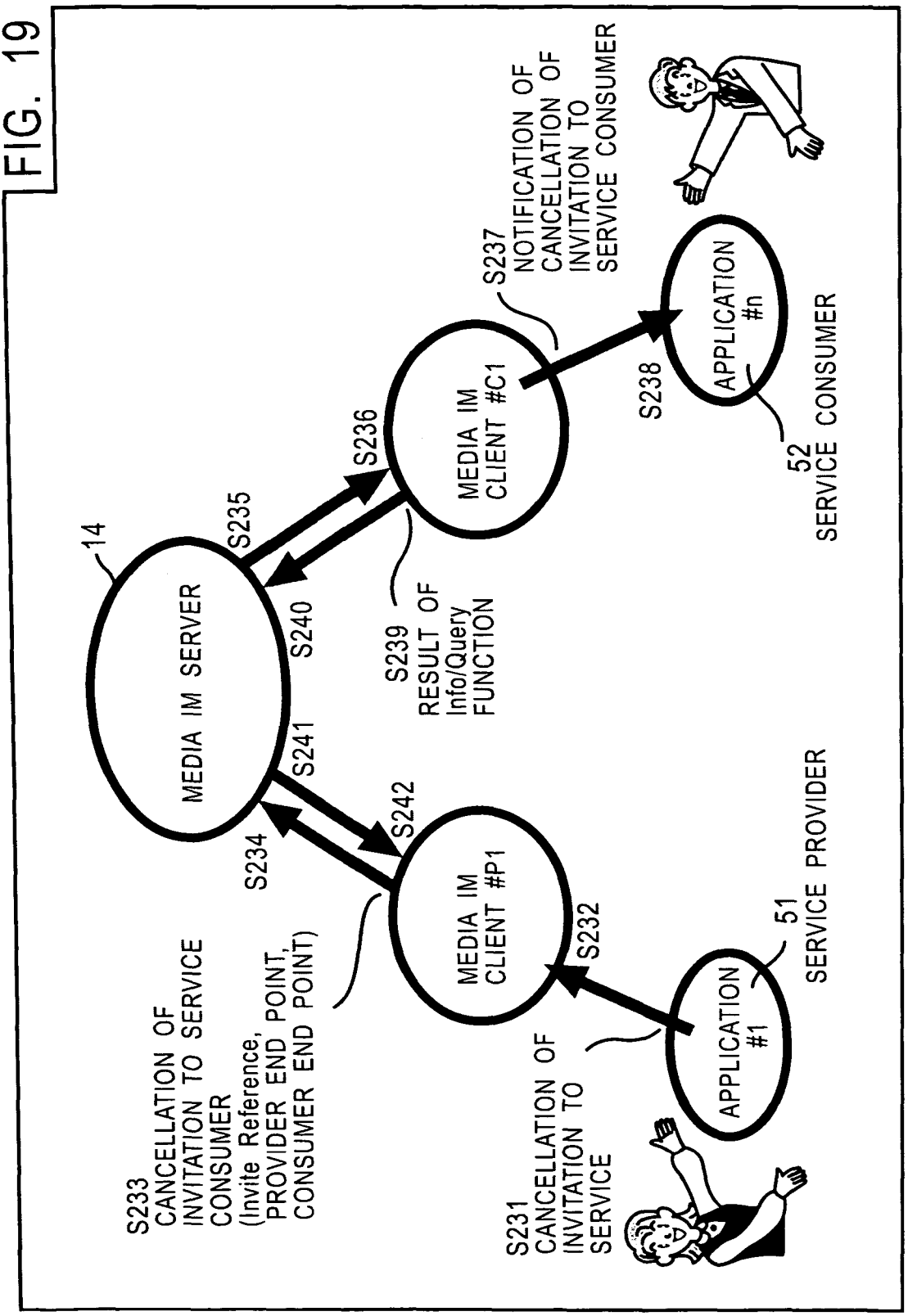

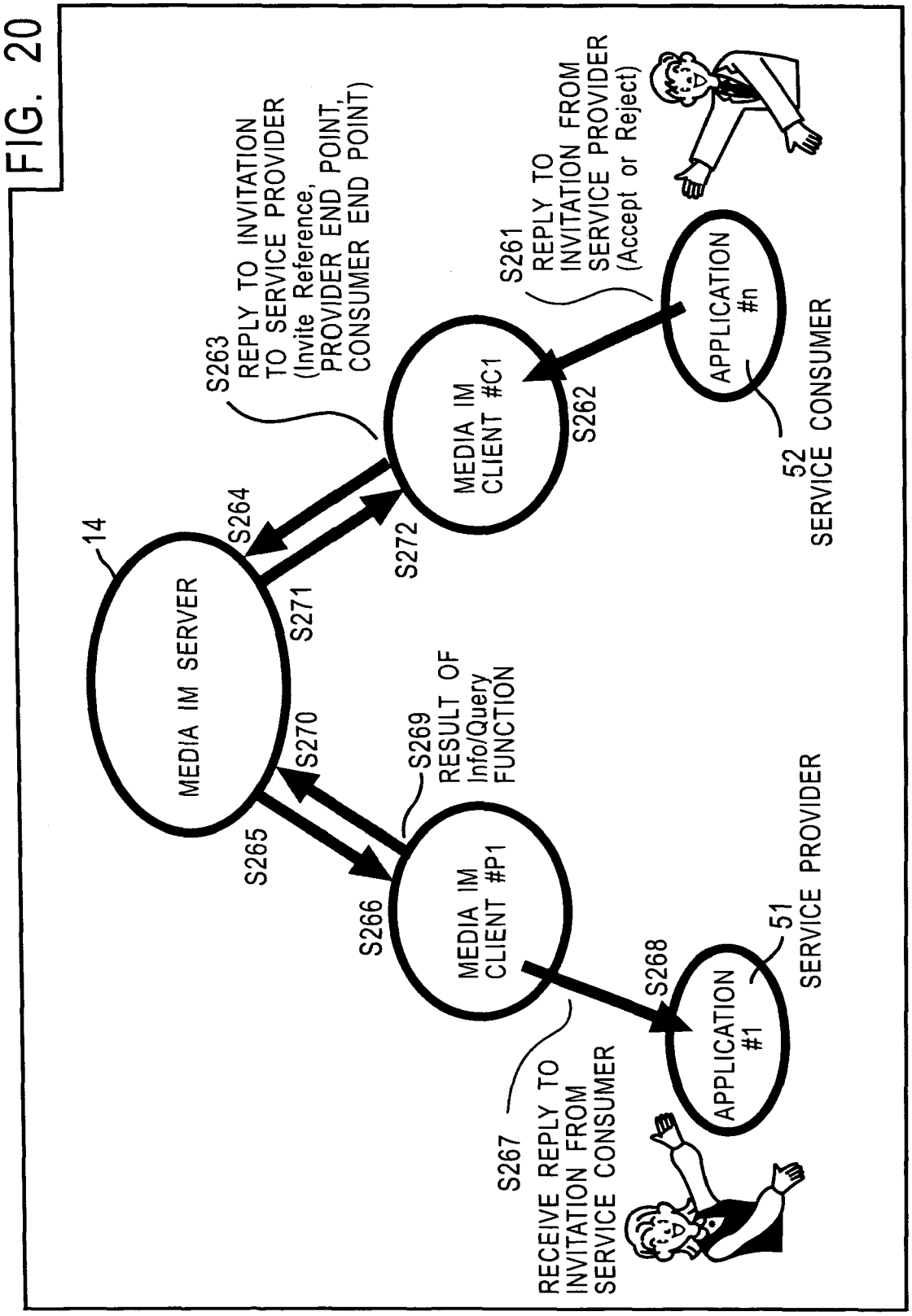

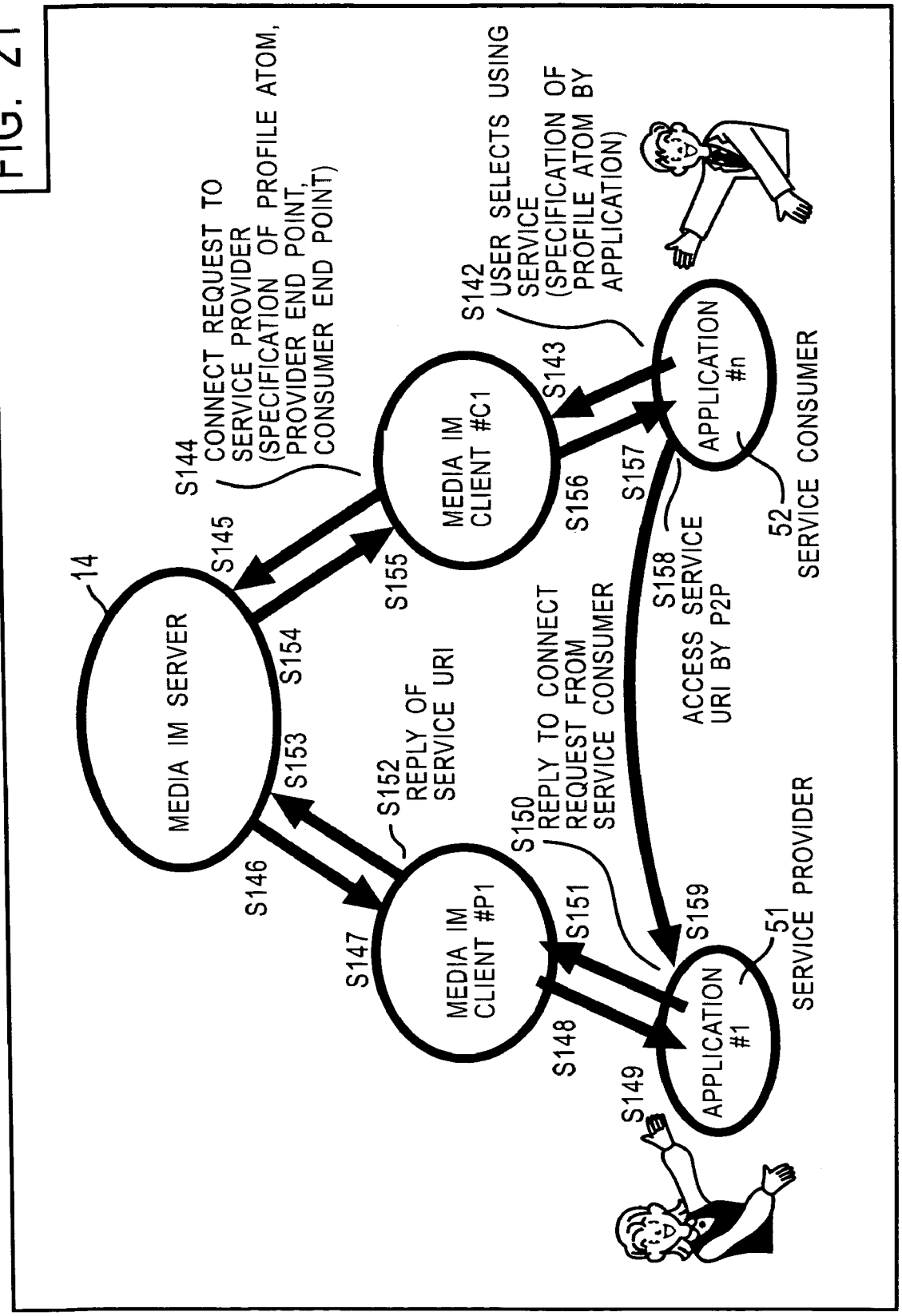

PROGRAM, INFORMATION PROCESSING METHOD AND DEVICE

TECHNICAL FIELD

The present invention relates to programs and information processing methods and apparatuses, particularly to a program and an information processing method and apparatus with which a connection can be formed reliably between apparatuses having different capabilities.

BACKGROUND ART

Recently, the Internet has become popular, leading to an increase in the number of users who exchange various data with other users over the Internet.

However, for example, when a user wishes to send a certain image to an apparatus of another user, it has been the case that mutual connection is essentially prohibited due to difference between the capabilities of an own apparatus of the user and the apparatus of another user, resulting in a failure in transmitting image data.

In order to prevent this situation, a user must check the capability of a device at the other end in advance.

For example, in the case of streaming, as a method of exchanging streaming parameters between a server and a client, RTSP (Real Time Streaming Protocol) (Real Time Streaming Protocol, IETF RFC 2326, April 1998, <http://www.ietf.org/rfc/rfc/2326.txt>) describes use of SDP (Session Description Protocol) (SDP: Session Description Protocol, IETF RFC 2327, April 1998, <http://www.ietf.org/rfc/rfc/2327.txt>).

However, these documents do not define a specific procedure for exchanging parameters, raising difficulty in exchanging data reliably with each other.

DISCLOSURE OF INVENTION

The present invention has been made in view of the situation described above, and it aims at allowing a connection to be established quickly and reliably with a device of the other party, reliably irrespective of the capability of the device of the other party, serving to improve usability.

A first program according to the present invention includes a first notifying step of notifying a first information processing apparatus, via a second information processing apparatus on the network, of identification information for identifying a service that can be provided; a second notifying step of notifying the first information processing apparatus, via the second information processing apparatus, of detailed information regarding the service that can be provided, based on a request from the first information processing apparatus; and a third notifying step of notifying that the first information processing apparatus has been registered for the service that can be provided, based on a request from the first information processing apparatus, and notifying the first information processing apparatus, via the second information processing apparatus, of connection information for allowing the first information processing apparatus that has been registered to establish a connection without connecting to the second information processing apparatus, based on a request from the first information processing apparatus.

The program may further include an accepting step of accepting an access that is made based on the connection information by the first information processing apparatus that has been registered, without connecting to the second information processing apparatus.

The notification in the first notifying step may use a presence function of instant messaging, and the notification in the second notifying step and the notification in the third notifying step may use a messaging function or an Info/Query function of instant messaging.

The first notifying step may further issue a notification of a provider entity identifier for identifying an entity that acts as a provider who provides the service.

The program may further include a registering step of registering the provider entity identifier and a user entity identifier for identifying an entity that acts as a user who uses the service associated with the provider entity identifier, such that the provider entity identifier and the user entity identifier are associated with each other, when a request for registering the first information processing apparatus for the service that can be provided has been transmitted from the first information processing apparatus together with the user entity identifier.

The program may further include a first sending step of sending invitation information for inviting the entity associated with the user entity identifier to use the service.

The first sending step may send the invitation information using a messaging function or an Info/Query function of instant messaging.

The first sending step may send the invitation information to the user associated with the user entity identifier registered by the processing in the registering step.

The program may further include a second sending step of sending cancellation information for canceling the invitation for using the service after the invitation information is sent by the processing in the first sending step.

The second sending step may send the cancellation information using a messaging function or an Info/Query function of instant messaging.

In the second sending step, a reference number for identifying the cancellation information, the provider entity identifier, and the user entity identifier may be included in the cancellation information.

A first information processing method according to the present invention includes a first notifying step of notifying first another information processing apparatus, via second another information processing apparatus on the network, of identification information for identifying a service that can be provided; a second notifying step of notifying the first another information processing apparatus, via the second another information processing apparatus, of detailed information regarding the service that can be provided, based on a request from the first another information processing apparatus; and a third notifying step of notifying that the first another information processing apparatus has been registered for the service that can be provided, based on a request from the first another information processing apparatus, and notifying the first another information processing apparatus, via the second another information processing apparatus, of connection information for allowing the first another information processing apparatus that has been registered to connect to the information processing apparatus without connecting to the second another information processing apparatus, based on a request from the first another information processing apparatus.

A first information processing apparatus according to the present invention includes first notifying means for notifying first another information processing apparatus, via second another information processing apparatus on the network, of identification information for identifying a service that can be provided; second notifying means for notifying the first another information processing apparatus, via the second another information processing apparatus, of detailed information regarding the service that can be provided, based on a request from the first another information processing apparatus; and third notifying means for notifying that the first another information processing apparatus has been registered for the service that can be provided, based on a request from the first another information processing apparatus, and notifying the first another information processing apparatus, via the second another information processing apparatus, of connection information for allowing the first another information processing apparatus that has been registered to connect to the information processing apparatus without connecting to the second another information processing apparatus, based on a request from the first another information processing apparatus.

A second program according to the present invention includes a first receiving step of receiving identification information for identifying a service that can be provided, from a first information processing apparatus via a second information processing apparatus on the network; a first requesting step of requesting, via the second information processing apparatus, the first information processing apparatus to send detailed information regarding the service that can be provided; a second requesting step of requesting, via the second another information processing apparatus, the first information processing apparatus to register itself for the service that can be provided; a first sending step of sending information regarding use of the service that can be provided, to the first information processing apparatus via the second information processing apparatus; and a second receiving step of receiving connection information for connecting to the information processing apparatus without connecting to the second information processing apparatus, from the first information processing apparatus via the second information processing apparatus.

The program may further include an accessing step of making an access based on the connection information without connecting to the second information processing apparatus.

The requests in the first step and in the second step and the sending in the first sending step may use a messaging function or an Info/Query function of instant messaging.

The first receiving step may receive, together with the identification information, a provider entity identifier for identifying an entity that acts as a provider who provides the service, and the program may further include a storing step of storing the provider entity identifier and a user entity identifier for identifying an entity that acts as a user who uses the service, such that the provider entity identifier and the user entity identifier are associated with each other.

The program may further include a third receiving step of receiving invitation information of invitation for using the service, sent by the first information processing apparatus.

The program may further include a second sending step of sending information indicating acceptance or rejection when the invitation information is received by the processing in the third receiving step.

The sending in the second sending step may use a messaging function or an Info/Query function of instant messaging.

When the third step has been executed, the first sending step may send information regarding usage of the service that can be provided, on condition that the information indicating acceptance has been sent by the processing in the second sending step.

In the first sending step, the provider entity identifier and the user entity identifier may be included.

In the second sending step, a reference number for identifying the information indicating acceptance or rejection, the provider entity identifier, and the user entity identifier may be included in the information indicating acceptance or rejection.

A second information processing method according to the present invention includes a first receiving step of receiving identification information for identifying a service that can be provided, from first another information processing apparatus via second another information processing apparatus on the network; a first requesting step of requesting, via the second another information processing apparatus, the first another information processing apparatus to send detailed information regarding the service that can be provided; a second requesting step of requesting, via the second another information processing apparatus, the first another information processing apparatus to register the information processing apparatus for the service that can be provided; a sending step of sending information regarding use of the service that can be provided, to the first another information processing apparatus via the second another information processing apparatus; and a second receiving step of receiving connection information for connecting to the information processing apparatus without connecting to the second another information processing apparatus, from the first another information processing apparatus via the second another information processing apparatus.

A second information processing apparatus according to the present invention includes first receiving means for receiving identification information for identifying a service that can be provided, from first another information processing apparatus via second another information processing apparatus on the network; first requesting means for requesting, via the second another information processing apparatus, the first another information processing apparatus to send detailed information regarding the service that can be provided; second requesting means for requesting, via the second another information processing apparatus, the first another information processing apparatus to register the information processing apparatus for the service that can be provided; sending means for sending information regarding use of the service that can be provided, to the first another information processing apparatus via the second another information processing apparatus; and second receiving means for receiving connection information for connecting to the information processing apparatus without connecting to the second another information processing apparatus, from the first another information processing apparatus via the second another information processing apparatus.

A third program according to the present invention includes a first notifying step of notifying a first information processing apparatus, via a second information processing apparatus on the network, of identification information for identifying a service that can be provided; a second notifying step of notifying the first information processing apparatus, via the second information processing apparatus, of detailed information regarding the service that can be provided, based on a request from the first information processing apparatus; a third notifying step of notifying that the first information processing apparatus has been registered for the service that can be provided, based on a request from the first information processing apparatus, and notifying the first information processing apparatus, via the second information processing apparatus, of connection information for allowing the first information processing apparatus that has been registered to connect to itself without connecting to the second information processing apparatus, based on a request from the first information processing apparatus; a first receiving step of receiving the identification information from the first information processing apparatus via the second information processing apparatus; a first requesting step of requesting, via the second information processing apparatus, the first information processing apparatus to send detailed information regarding the service that can be provided; a second requesting step of requesting, via the second information processing apparatus, the first information processing apparatus to register itself for the service that can be provided; a sending step of sending information regarding use of the service that can be provided, to the first information processing apparatus via the second information processing apparatus; and a second receiving step of receiving connection information for connecting to the information processing apparatus without connecting to the second information processing apparatus, from the first information processing apparatus via the second information processing apparatus.

A third information processing method according to the present invention includes a first notifying step of notifying first another information processing apparatus, via second another information processing apparatus on the network, of identification information for identifying a service that can be provided; a second notifying step of notifying the first another information processing apparatus, via the second another information processing apparatus, of detailed information regarding the service that can be provided, based on a request from the first another information processing apparatus; a third notifying step of notifying that the first another information processing apparatus has been registered for the service that can be provided, based on a request from the first another information processing apparatus, and notifying the first another information processing apparatus, via the second another information processing apparatus, of connection information for allowing the first another information processing apparatus that has been registered to connect to the information processing apparatus without connecting to the second another information processing apparatus, based on a request from the first another information processing apparatus; a first receiving step of receiving the identification information from the first another information processing apparatus via the second another information processing apparatus; a first requesting step of requesting, via the second another information processing apparatus, the first another information processing apparatus to send detailed information regarding the service that can be provided; a second requesting step of requesting, via the second another information processing apparatus, the first another information processing apparatus to register the information processing apparatus for the service that can be provided; a sending step of sending information regarding use of the service that can be provided, to the first another information processing apparatus via the second another information processing apparatus; and a second receiving step of receiving connection information for connecting to the information processing apparatus without connecting to the second another information processing apparatus, from the first another information processing apparatus via the second another information processing apparatus.

A third information processing apparatus according to the present invention includes first notifying means for notifying first another information processing apparatus, via second another information processing apparatus on the network, of identification information for identifying a service that can be provided; second notifying means for notifying the first another information processing apparatus, via the second another information processing apparatus, of detailed information regarding the service that can be provided, based on a request from the first another information processing apparatus; third notifying means for notifying that the first another information processing apparatus has been registered for the service that can be provided, based on a request from the first another information processing apparatus, and notifying the first another information processing apparatus, via the second another information processing apparatus, of connection information for allowing the first another information processing apparatus that has been registered to connect to the information processing apparatus without connecting to the second another information processing apparatus, based on a request from the first another information processing apparatus; first receiving means for receiving the identification information from the first another information processing apparatus via the second another information processing apparatus; first requesting means for requesting, via the second another information processing apparatus, the first another information processing apparatus to send detailed information regarding the service that can be provided; second requesting means for requesting, via the second another information processing apparatus, the first another information processing apparatus to register the information processing apparatus for the service that can be provided; sending means for sending information regarding use of the service that can be provided, to the first another information processing apparatus via the second another information processing apparatus; and second receiving means for receiving connection information for connecting to the information processing apparatus without connecting to the second another information processing apparatus, from the first another information processing apparatus via the second another information processing apparatus.

According to a first present invention, a first information processing apparatus is notified of identification information, the first information processing apparatus is notified of detailed information based on a request from the first information processing apparatus, and a notification of registration for a service that can be provided and a notification of connection information are issued based on a request from the first information processing apparatus.

According to a second present invention, identification information is received from a first information processing apparatus, the first information processing apparatus is requested to send detailed information, and the first information processing apparatus is requested to register itself. Furthermore, information regarding use of the service is sent to the first information processing apparatus, and connection information is received from the first information processing apparatus.

According to a third present invention, a first information processing apparatus (first another information processing apparatus) is notified of identification information, a notification of detailed information is issued based on a request from the first information processing apparatus (the first another information processing apparatus), and a notification of registration of the first information processing apparatus (the first another information processing apparatus) for a service and a notification of connection information are issued based on a request from the first information processing apparatus (the first another information processing apparatus).

Furthermore, the identification information is received from the first information processing apparatus (the first another information processing apparatus), the first information processing apparatus (the first another information processing apparatus) is requested to send the detailed information, the first information processing apparatus (the first another information processing apparatus) is requested to register itself, information regarding the service is sent to the first information processing apparatus (the first another information processing apparatus), and the connection information is received from the first information processing apparatus (the first another information processing apparatus).

BRIEF DESCRIPTION OF THE DRAWINGS

FIG. 8 is a diagram showing an example of a profile space.

FIG. 9 is a diagram showing an example of a profile description.

FIG. 10 is a diagram showing an example of a profile atom.

FIG. 18 is a flowchart showing an operation of the network system shown in FIG. 1.

FIG. 19 is a flowchart showing an operation of the network system shown in FIG. 1.

FIG. 20 is a flowchart showing an operation of the network system shown in FIG. 1.

FIG. 21 is a flowchart showing an operation of the network system shown in FIG. 1.

BEST MODE FOR CARRYING OUT THE INVENTION

Figure 1:
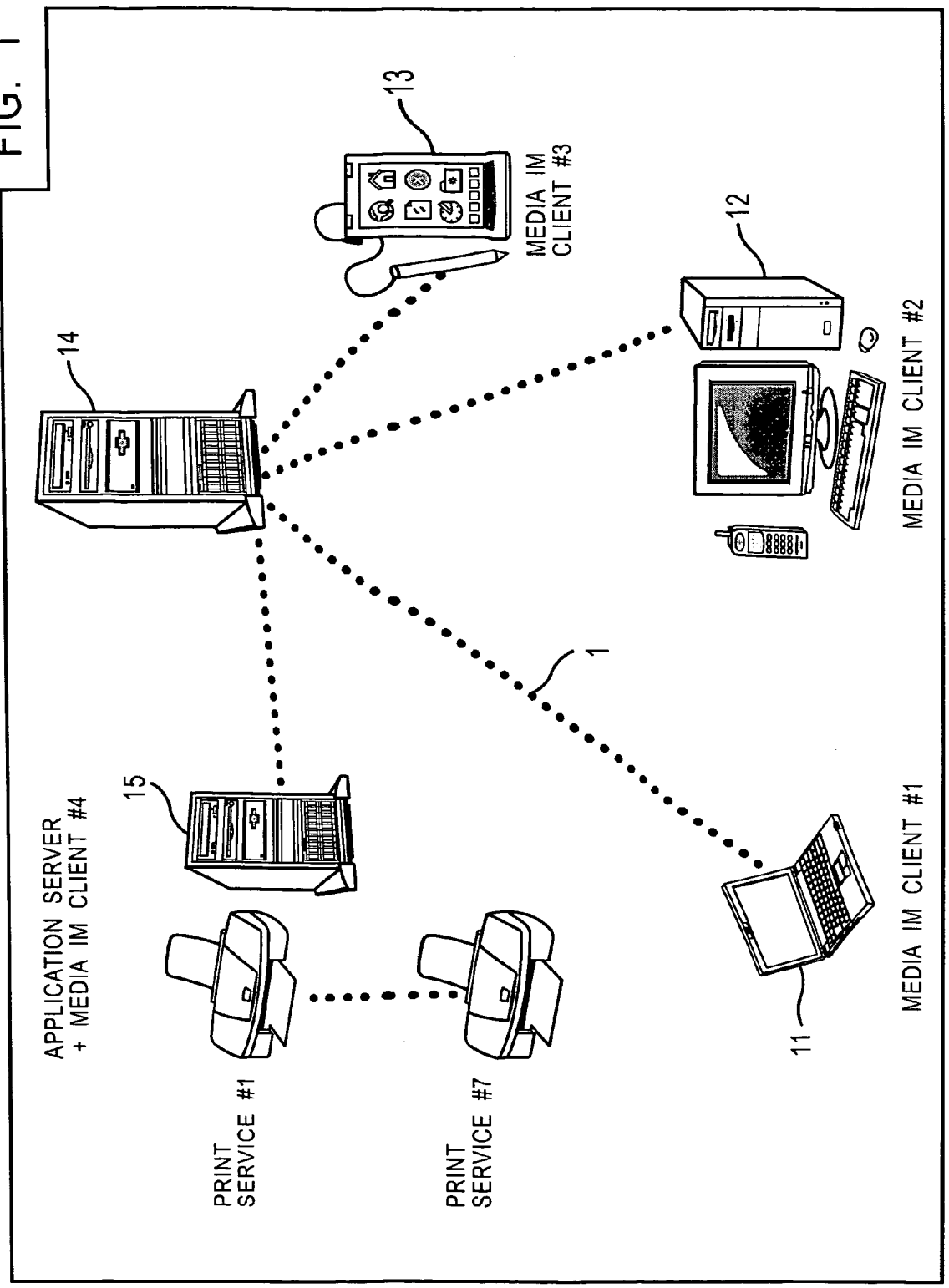
FIG. 1 is a diagram showing an example configuration of a network system according to the present invention.

FIG. 1 shows an example configuration of a network system according to the present invention. In the network system, as user terminals, personal computers 11 and 12 and PDA (Personal Digital Assistants) 13 are connected to a media instant message server (Media IM Server) 14. Also, an application server 15 is connected to the media IM server 14 via the Internet 1.

In the personal computer 11, a media IM client #1 is implemented as middleware. In the personal computer 12, a media IM client #2 is implemented as middleware. Similarly, in the PDA 13, a media IM client #3 is implemented as middleware.

In the application server 15, a media IM client #4 is implemented as middleware. The application server 15 provides print services #1 to #7 to users accessing the application server 15.

The media IM server 14 controls instant message processing among these media IM clients #1 to #4.

Figure 2:
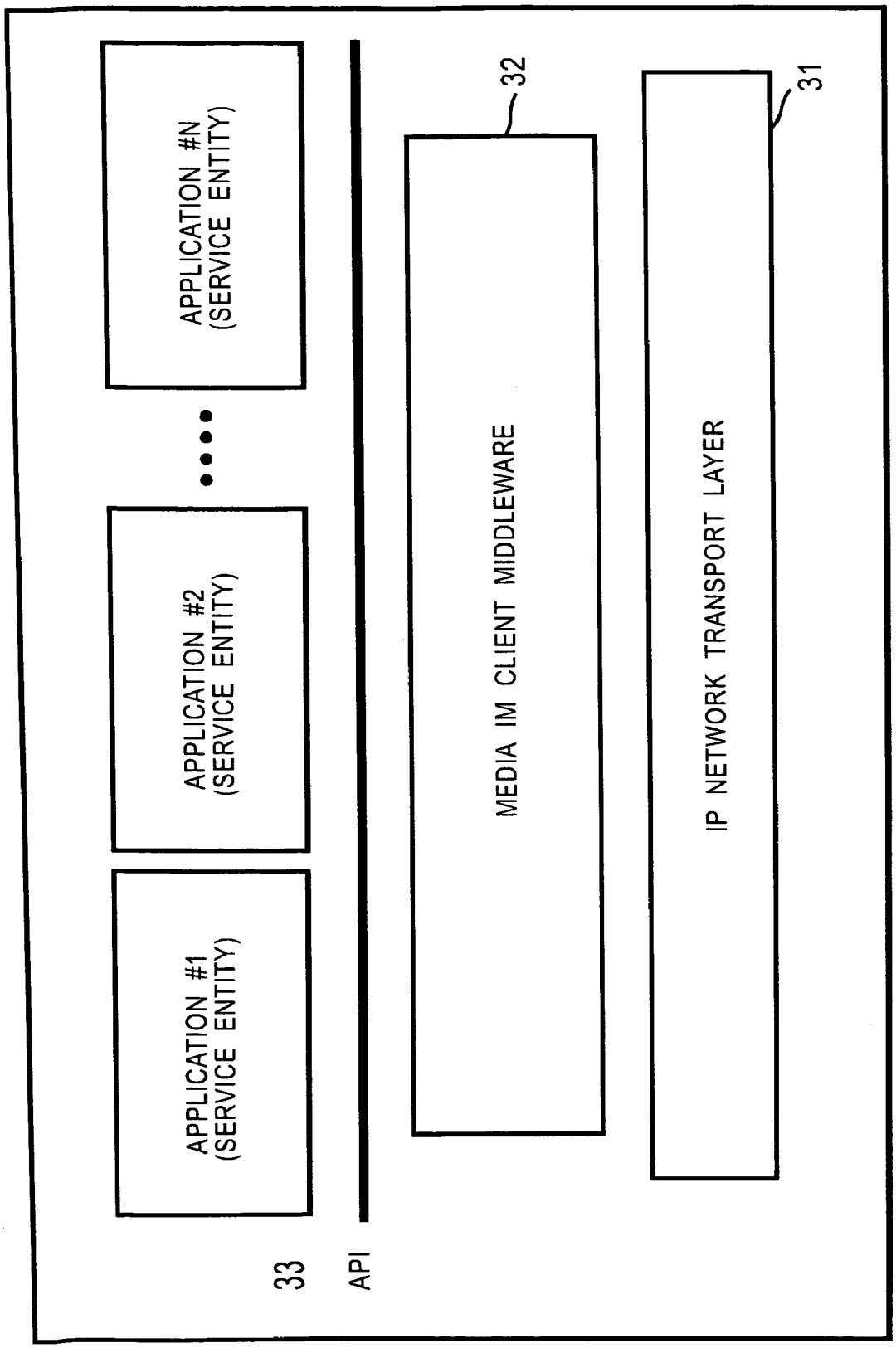
FIG. 2 is a diagram showing a software hierarchy.

FIG. 2 shows the software configuration. In FIG. 2, the media IM clients #1 to #4 described above are shown as media IM client middleware 32. The media IM client middleware 32 is provided between an IP network transport layer 31 and an API (Application Program Interface) 33. The API 33 executes interface processing between applications #1 to #N and the media IM client middleware 32. The media IM client middleware 32 executes interface processing between the API 33 and the IP network transport layer 31.

The applications #1 to #N respectively constitute service entities.

Figure 3:
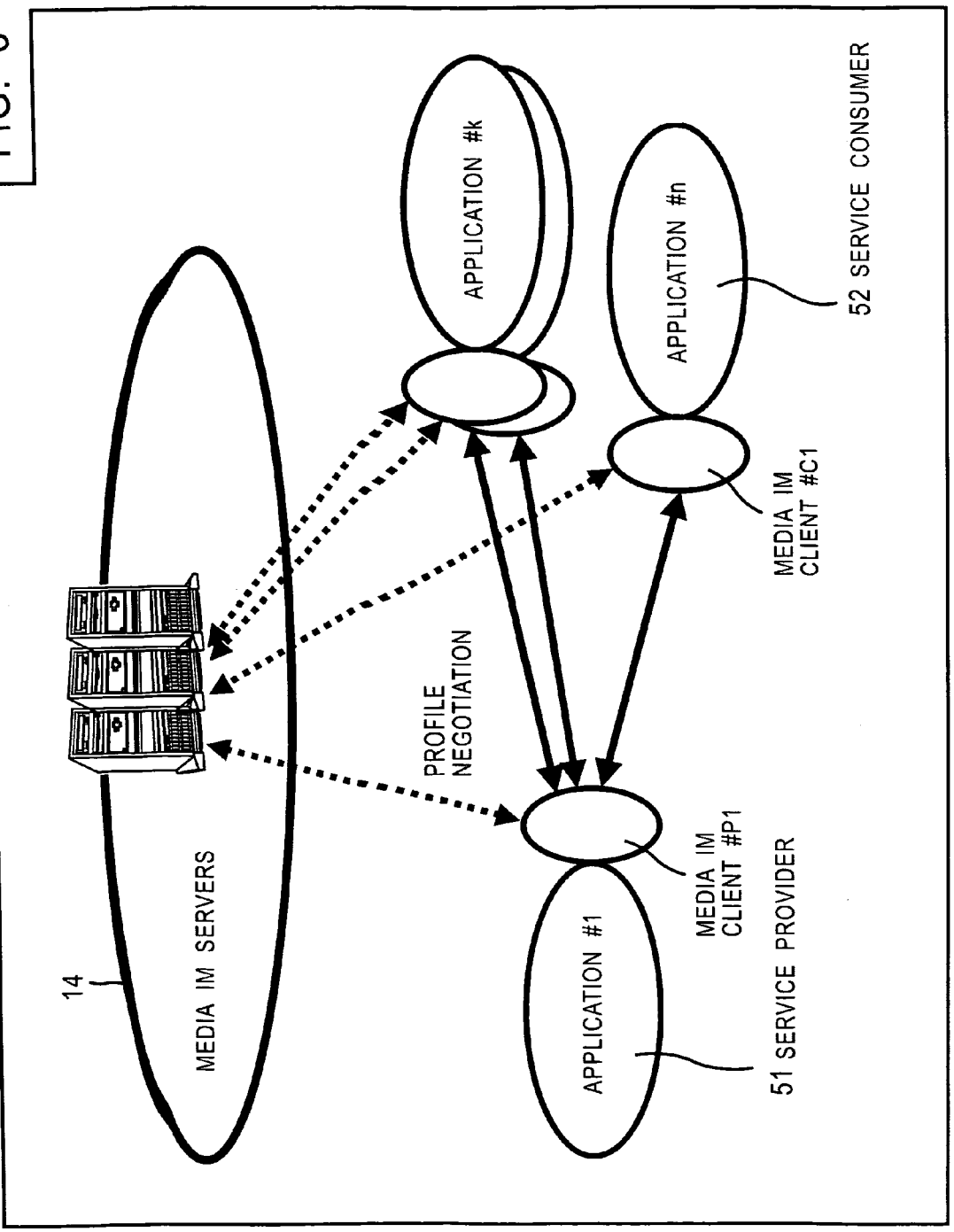
FIG. 3 is a diagram showing the overall operation of the network system according to the present invention.

In the network system, as shown in FIG. 3, an application that provides a service (the application #1 in the example shown in FIG. 3) acts as a service provider 51, and an application that receives the service (i.e., that consumes the service) (the application #n in the example shown in FIG. 3) acts as a service consumer 52.

The service provider 51 and the service consumer 52 execute a negotiation process for connection via media IM clients #P1 and #C1 respectively associated therewith, using a presence function, messaging function, or Info/Query function of instant messaging. After confirming by the negotiation that mutual connection is possible, the service provider 51 and the service consumer 52 execute a connection process by peer to peer (P2P).

The service provider 51 and the service consumer 52 respectively constitute service entities. A single application may consist entirely of a service entity in some cases, or consist of a set of service entities. Hereinafter, for simplicity, it will be assumed that a single service entity corresponds to a single application.

Next, the connection process will be described in detail with reference to flowcharts shown in FIGS. 4 to 7.

In step S1, the application #1 acting as the service provider 51 instructs the media IM client #P1 to announce a profile space ID representing types of services that it can provide to buddies registered in a roster. Upon receiving the instruction in step S2, the media IM client #P1, in step S3, notifies the buddies that have been registered in the roster of the profile space ID by presence.

A buddy refers to a party involved in message communication with a user (or a media IM client) in an instant messaging service provided by the media IM server 14. A buddy is information represented by a user ID, a nickname associated with a user ID, or the like, registered in advance in the media IM server 14.

A roster refers to a list of buddies, i.e., a list of user IDs (or nicknames) of other users (or other media IM clients) specified by a user (or a media IM client) as parties involved in message communication. Rosters for respective users are unitarily managed by the media IM server 14.

For example, if a user of the media IM client #P1 has specified a user of the media IM client #C1 as a party involved in message communication, the user (a user ID or the like) of the user of the media IM client #C1 is registered as a buddy in a roster associated with the media IM client #P1. Conversely, if the user of the media IM client #C1 has specified the user of the media IM client #P1 as a party involved in message communication, the user of the media IM client #P1 is registered as a buddy in a roster associated with the media IM client #C1.

As described above, in order to execute message communication by instant messaging, parties involved must be mutually registered in advance in rosters as buddies. For example, if a first user of a media IM client has registered a second user of another media IM client as a buddy in a roster and if the second user has not registered the first user as a buddy in the client of the second user, in order to execute message communication, the first user must be registered by the second user as a buddy in a roster prior to message communication.

When a user has logged in (connected) to the media IM server 14 using a media IM client, the roster is provided as required from the media IM server 14 to the media IM client, and is displayed in the form of a GUI (Graphical User Interface) on a display or the like. At that time, the media IM server 14 supplies to the media IM client icons that allow the user to readily recognize intended buddies, and information relating to the buddies (e.g., information representing whether or not communication is possible), such as presence, as well as the roster described above. The media client, upon receiving the roster and related information, displays the buddies in the roster in association with the icons and presence.

It is to be understood that the rosters described above may be managed by a server provided particularly for unitarily managing the rosters.

Profile space IDs and application IDs are registered in advance and managed by an administrator of an application platform that allows negotiation of profiles at an application level based on a presence function, messaging function, and Info/Query function of instant messaging, such as the network system shown in FIG. 1. Thus, the service consumer 52 is allowed to identify contents based on the IDs.

FIG. 8 shows an example of a profile space for defining an MPEG-4 streaming server application that runs on the personal computer 11. As shown in the figure, the profile space is an M dimensional space that represent services provided by the personal computer, and is constituted by a profile space ID that serves as an ID for identifying each profile space and M dimensional parameters. In this example, the profile space ID is "10000001", and the parameters include "access method", "bit rate (link speed)", "X scale", "Y scale", and "audio codec". In this example, the value of the access method, representing a protocol used for communication, is 1(RTSP/TCP+RTP/UDP) or 2(HTTP tunnelling). The value of the bit rate, representing a rate of a communication line that is connected, is 6 k to 512 kbps. The value of the X scale, representing a screen size in a horizontal direction, is 128 pixels to 352 pixels. The value of the Y scale, representing a screen size in a vertical direction, is 96 pixels to 288 pixels.

The access method in the profile represents a protocol used for communication, for example, either RTSP (Real Time Streaming Protocol)/TCP (Transmission Control Protocol)+RTP (Real Time Transport Protocol)/UDP (User Datagram Protocol) represented by number 1 or HTTP (Hyper Text Transfer Protocol) tunnelling represented by number 2. The bit rate represents a data transfer rate of a communication line that is used. That is, the bit rate serves as information for determining an MPEG-4 data transfer rate of an MPEG-4 streaming service provided by the application #1.

The video codec representing a method of video compression and expansion is MPEG-4. The audio codec representing a method of audio compression and expansion is one of none, CELP (Code Excited Linear Predictive) 8 k, CELP 16 k, AAC (Advanced Audio Coding) 16 k, AAC 32 k, AAC 44.1 k, and AAC 48 k.

As described above, all the parameters are represented by numeric values. Thus, the availability of a service can be determined quickly and readily between a service provider that provides the service and a service consumer that receives the service (i.e., that uses the service).

Referring back to FIG. 4, upon receiving the notification from the media IM client #P1 in step S4, the media IM server 14, in step S5, announces the notification to each buddy in the roster.

The media IM client #C1, which is one of the buddies (the service consumer 52) that receive the announcement, upon receiving the notification in step S6, determines (verifies) in step S7 whether the profile is acceptable for the media IM client #C1 based on the profile space ID and the application ID of the service provider 51 (the ID of the application #1 in this example). This is possible since, as described earlier, each participant in the system is allowed to identify content of the profile (functions of a device of another party involved, as shown in FIG. 8) based on these IDs.

For example, each of the media IM clients (i.e., the personal computers 11 and 12, and the like) stores in advance a table in which application IDs and profile IDs are associated with type of parameters included in profiles and sets of values that the parameters are allowed to take on, and information regarding applications that act as service consumers, as shown in FIG. 8. In step S7, the media IM client refers to the table that it holds, identifies types of parameters included in a profile associated with the application ID and the profile ID obtained in step S6 and a set of values that the parameters are allowed to take on, and determines, based on the information that it holds regarding the application, whether the parameters identified (the profile associated with the parameters) are compatible with the functions of the application that acts as a service consumer (i.e., whether the parameters are acceptable).

The table defining association between IDs and contents may be stored in each device (the personal computers 11 and 12, and the like), or in a predetermined server (e.g., the media IM server 14). In that case, a user may be billed each time the user uses the table for verification. This allows an administrator of the media IM server 14 to earn profit.

If the media IM client #C1 determines that the content of the profile for which presence has been received from the service provider 51 is acceptable for the service consumer, in step S8, the media IM client #C1 notifies the content of the profile (a profile associated with the profile space ID, shown in FIG. 8) of the application #n that acts as the service consumer 52 capable of accepting the profile. In step S9, the application #n receives the notification from the media IM client #C1.

Each of the media IM clients, having received the announcement from the service provider (steps S4 to S6), ignores the announcement if it is determined by the verification in step S7 that an application that suitably acts as a service consumer does not exist.

Upon receiving the content of the presence from the service provider 51, the application #n acting as the service consumer 52, in step S10, instructs the media IM client #C1 to obtain detailed information of the service provided by the service provider 51. Upon receiving the instruction in step S11, the media IM client #C1, in step S12, using the messaging function or Info/Query function, requests transmission of a provider profile including a part of or all the parameters of the parameter set of the profile space of the service provided by the service provider 51, described earlier. The request includes destination information for specifying the service provider 51.

When a notification or request is issued using the Info/Query function, as opposed to a case where the messaging function is used, a response for acknowledgement of reception is supplied from the recipient to the sender. For example, when the application #1 of the media IM client #P1 obtains a roster from the media IM server 14, the media IM client #P1 uses the Info/Query function to supply a GET command or the like to the media IM server 14. Upon receiving the GET command, the media IM server 14 supplies a response acknowledging reception to the application #1 via the media IM client #P1 at the source of the command. By the response, the application #1 is allowed to confirm that the GET command has been supplied to the media IM server 14.

Since an acknowledge response is supplied from a destination to a source at the application level as described above, an application is allowed to send a notification or request reliably to a destination by using the Info/Query function.

On the other hand, when a notification or request is issued using the messaging function, an application at a destination that has received the notification or request does not supply the acknowledgement response described above to a source. Thus, an application at the source is not allowed to grasp whether the notification or request issued using the messaging function has been received by the destination. Therefore, compared with the case where the Info/Query function is used, the reliability of transmission to an intended destination becomes lower. However, when a notification or request is issued using the messaging function, communication process becomes simpler compared with the case where the Info/Query function is used, so that processing load becomes smaller. The messaging function is used, for example, for exchanging an instant message (INSTANT MESSAGING) of a text document between media IM clients.

The notification or request by the Info/Query function, and the notification or request by the messaging function, described above, can be used by media IM servers as well as media IM clients, and can be used, for example, as a notification or request between media IM clients as well as a notification or request between a media IM client and a media IM server.

Furthermore, notifications or requests by the Info/Query function or the messaging function may include any data regardless of content, such as messages and parameters, as well as commands.

As described above, the media IM client #P1, the media IM client #C1, and the media IM server 14 exchange data (including notifications, requests, and the like) using the messaging function or the Info/Query function.

As described above, the media IM client #P1 or the like may send a provider profile using either the messaging function or the Info/Query function. It is to be noted that when a provider profile is sent using the Info/Query function, a response to the transmission of the provider file is supplied from the destination to the source of the transmission.

Upon receiving the request from the media IM client #C1 in step S13, the media IM server 14, in step S14, sends the request to the media IM client #P1. Upon receiving the request from the media IM server 14 in step S15, the media IM client #P1, in step S16, supplies the request to the application #1 acting as the service provider 51.

Upon receiving the request from the media IM client #P1 in step S17, the application #1, in step S18, assembles a provider profile that is to be provided to the service consumer 52, and sends the provider profile to the media IM client #P1.

The content of the provider file generated by the application #1 specifically sets ranges of values of parameters that the service provider 51 can actually provide to the service consumer 52 with consideration of runtime environments such as network link speed and CPU load status.

FIG. 9 shows an example of a provider profile generated as described above. In FIG. 9, the provider profile is represented as a profile description.

FIG. 9 shows an example where the application #1 acting as the service provider 51 only supports a viewing angle corresponding to VGA (Video Graphics Array) (160 pixels× 120 pixels or 320 pixels×240 pixels), and is connected to a network equivalent to a PHS (Personal Handyphone System) (a network with a maximum link speed of 128 kbps). Thus, in the example shown in FIG. 9, with consideration of the network link speed, the viewing angle is limited only to 160 pixels×120 pixels (X scale×Y scale) of the range defined by the profile space shown in FIG. 8.

In the example shown in FIG. 9, the profile space ID is "10000001", indicating that the profile description corresponds to the profile space shown in FIG. 8. That is, as described earlier, when the media IM client #C1 requests a provider profile in step S12, in response to the request, a profile description (provider profile) corresponding to the profile space ID supplied by the media IM client #P1 in step S3 is generated, as shown in FIG. 9.

The access method in FIG. 9 is either RTSP/TCP+RTP/UDP or HTTP tunnelling. The bit rate is 6 kpbs to 128 kbps. The audio codec is none or CELP 8 k.

Upon receiving a response for the provider profile from the application #1 in step S19, the media IM client #P1, in step S20, returns the response to the application #n using the messaging function or the Info/Query function.

Upon receiving the reply from the media IM client #P1 in step S21, the media IM server 14, in step S22, sends the reply to the media IM client #C1. Upon receiving the reply in step S23, the media IM client #C1, in step S24, sends the reply to the application #n. In step S25, the application #n receives the reply from the service provider 51 (including the provider profile shown in FIG. 9).

The application #n checks matching (performs a comparison) between the provider profile of the service provider 51, received by the processing in step S25, and a consumer profile that the application #n itself generates.

As described earlier, the provider profile is a profile created by the application #1 based on the profile space of the content determined by the media IM client #C1 as acceptable by the service consumer. That is, the profile space corresponding to the provider profile is also supported by the application #n acting as the service consumer. Thus, the application #n is allowed to execute the same process as in the case where the application #1 creates a provider profile, thereby creating a profile including a part of or all the parameters in a parameter set of the profile space supported by the service consumer (i.e., a consumer profile). The application #n checks matching between the received provider profile of the service provider 51 and the consumer profile created as described above.

As described earlier, the provider profile (profile description) presented by the service provider is represented by numeric values only. Thus, the service provider 51 is allowed to readily verify matching simply by a one-dimensional comparison with ranges of values of parameters included in its own profile.

A dimension herein refers to the effective number of parameters. That is, the service consumer 52 compares, one by one, the range of values of each parameter of the consumer profile with the range of values of the corresponding parameter of the provider profile.

If a part of or all of the ranges of values of the parameters of the consumer profile overlap the ranges of values of the corresponding parameters of the provider profile, that is, if it is determined that a range exists in which the service consumer 52 is capable of receiving the service provided by the service provider 51 (the application #n is capable of accepting data sent by the application #1), the service consumer 52 determines that matching is confirmed.

If matching is confirmed, the application #n, in step S26, requests the service provider 51 to register itself (i.e., the service consumer 52) to the service provided. Upon receiving the request from the application #n in step S27, the media IM client #C1, in step S28, requests the service provider 51 for registration to the service, using the messaging function or the Info/Query function, i.e., requests registration of the service consumer 52 as a receiver of the service through registration of the application ID of the application #n of the service consumer 52. At this time, the profile space ID and the application ID (ID of the application #n) are included in the request.

Upon receiving the request from the media IM client #C1 in step S29, the media IM server 14, in step S30, sends the request to the media IM client #P1. Upon receiving the request from the media IM server 14 in step S31, the media IM client #P1, in step S32, sends the request to the application #1. In step S33, the application #1 receives the registration request from the service consumer 52.

The application #1 acting as the service provider 51 registers the service consumer 52 in association with the service provided to the service consumer 52 by the processing in step S18. More specifically, the application ID of the application #n of the service consumer 52 is registered in association with the profile space ID.

The information regarding the service consumer 52, registered as described above, is used when the application #1 provides a service. That is, the application #1 refers to the registered information, and provides a service to an application of the service consumer 52 (an application corresponding to the application ID) based on the information.

In step S34, the application #1 instructs the media IM client #P1 to issue a response to the request for registration to the service, supplied from the service consumer 52 (i.e., information indicating whether registration of the application #n has been completed), the request being a request for registering the application ID of the application #n of the service consumer 52 in association with the profile space ID to thereby register the service consumer 52 as a receiver of the service. Upon receiving the instruction in step S35, the media IM client #P1, in step S36, issues a notification of a registration result that serves as a response to the request supplied thereto, using the messaging function or the Info/Query function. Upon receiving the notification of the registration result in step S37, the media IM server 14, in step S38, sends the notification to the media IM client #C1. Upon receiving the notification in step S39, the media IM client #C1, in step S40, sends the notification to the application #n. In step S41, the application #n receives the notification of the registration result.

In step S42, the application #n determines, as a profile atom, parameters for assuring connectivity based on the profile description from the service provider 51 (i.e., the provider profile received by the processing in step S25). That is, parameters that allow the application #n to use data sent by the application #1 as it is (parameters acceptable by the application #n) are determined.

FIG. 10 shows an example of the description of the profile atom. In this example, the profile space ID is "10000001", indicating that the profile atom corresponds to the profile space shown in FIG. 8. That is, as described earlier, upon receiving a profile description (provider profile) corresponding to the profile space ID, created and supplied by the media IM client #P1 in response to a request from the media IM client #C1, the media IM client #C1 creates a consumer profile corresponding to the profile space ID, and compares the consumer profile with the provider profile supplied thereto. If these profiles are determined as matching, the media IM client #C1 executes registration to the service provided, identifies ranges of parameters for assuring connectivity from the ranges of the respective parameters included in the profile space corresponding to the profiles, thereby generating a profile atom including parameters in those ranges, as shown in FIG. 10.

The access method is HTTP tunnelling. That is, as the access method in the provider profile shown in FIG. 9, access method associated with number 2 is selected.

The bit rate is 48 kbps, the X scale is 160, and the Y scale is 120. The audio codec is CELP 8 k.

In step S42, the application #n issues a connect request to which the profile atom determined as described above is attached. Upon receiving the request in step S43, the media IM client #C1, in step S44, sends the request to the service provider 51 using the messaging function or the Info/Query function. Upon receiving the request in step S45, the media IM server 14, in step S46, sends the request to the media IM client #P1. Upon receiving the request from the media IM server 14 in step S47, the media IM client #P1, in step S48, sends the request to the application #1. In step S49, the application #1 receives the request.

Upon receiving the request, the application #1, in step S50, sends to the service consumer 52 a response including connection information needed by the service consumer 52 (i.e., the application #n) to connect to the service provider 51 (i.e., the application #1). The connection information may be, for example, a URI (Uniform Resource Identifier) representing an address of the service provider 51 that is accessed when the service consumer 52 connects to the service provider 51 (service URI).

The response sent by the processing in step S50 by the application #1 is received by the media IM client #P1 in step S51. In step S52, the media IM client #P1 sends the response to the service consumer 52 using the messaging function or the Info/Query function. Upon receiving the response from the media IM client #P1 in step S53, the media IM server 14, in step S54, sends the response to the media IM client #C1. Upon receiving the response from the media IM server 14 in step S55, the media IM client #C1, in step S56, sends the response to the application #n. In step S57, the application #n receives the response.

After instructing sending of a response in step S50, the application #1 waits for a direct access (not via the media IM server 14) from the application #n. Thus, in step S58, the application #n accesses the service URL (Uniform Resource Locator) of the application #1 by peer to peer, not via the media IM server 14. In step S59, the application #1 accepts the peer-to-peer access to the URL by the application #n.

Thereafter, the application #1 and the application #n are allowed to exchange information by peer to peer.

The service provider 51 is an entity that provides a service (provider). On the other hand, the service consumer 52 is an entity that receives and uses a service provided (user). The provider and user of a service is relative; for example, when one of the personal computers 11 and 12 provides a service, the other uses the service. Thus, generally, the personal computer 11 is capable of acting both as the service provider 51 and the service consumer 52. Thus, the personal computer 11 has the application #n and the media IM client #C1 as a user of a service as well as the application #1 and the media IM client #P1 as a provider of a service. Similarly, the personal computer 12 has the application #1 and the media IM client

P1 as a provider of a service as well as the application #n and the media IM client #C1 as a user of a service.

As described above, according to the application platform of the present invention, new protocol architecture for allowing negotiation of profiles at the application level is implemented based on the presence function, messaging function, and Info/Query function of instant messaging. Thus, by using a match making function in the application platform, applications mounted on various devices having different capabilities (obviously, the capabilities may be the same), such as personal computers and mobile devices, are allowed to connect to each other readily and reliably. Accordingly, a system that allows rich media information including various information such as text, audio, music, moving pictures, and still pictures to be transmitted by peer-to-peer communication can be implemented. In that case, applications (service entities) for which connectivity is finally assured are allowed to communicate with each other by peer to peer. Accordingly, a user is allowed to exchange information readily and reliably without performing special operations.

The applications (service entities) described above may be applied to commercial application servers on the Internet 1 as well as personal computers and network-enabled CE. (Consumer Electronics) devices.

For example, in the application server 15 shown in FIG. 1, an application for a commercial print service is run as a service provider on the media IM client #4. Thus, the personal computers 11 and 12 and the PDA 13 shown in FIG. 1 are allowed to use, via the Internet 1, the print service provided by the application server 15, by executing the procedure described above with the application server 15.

Figure 11:
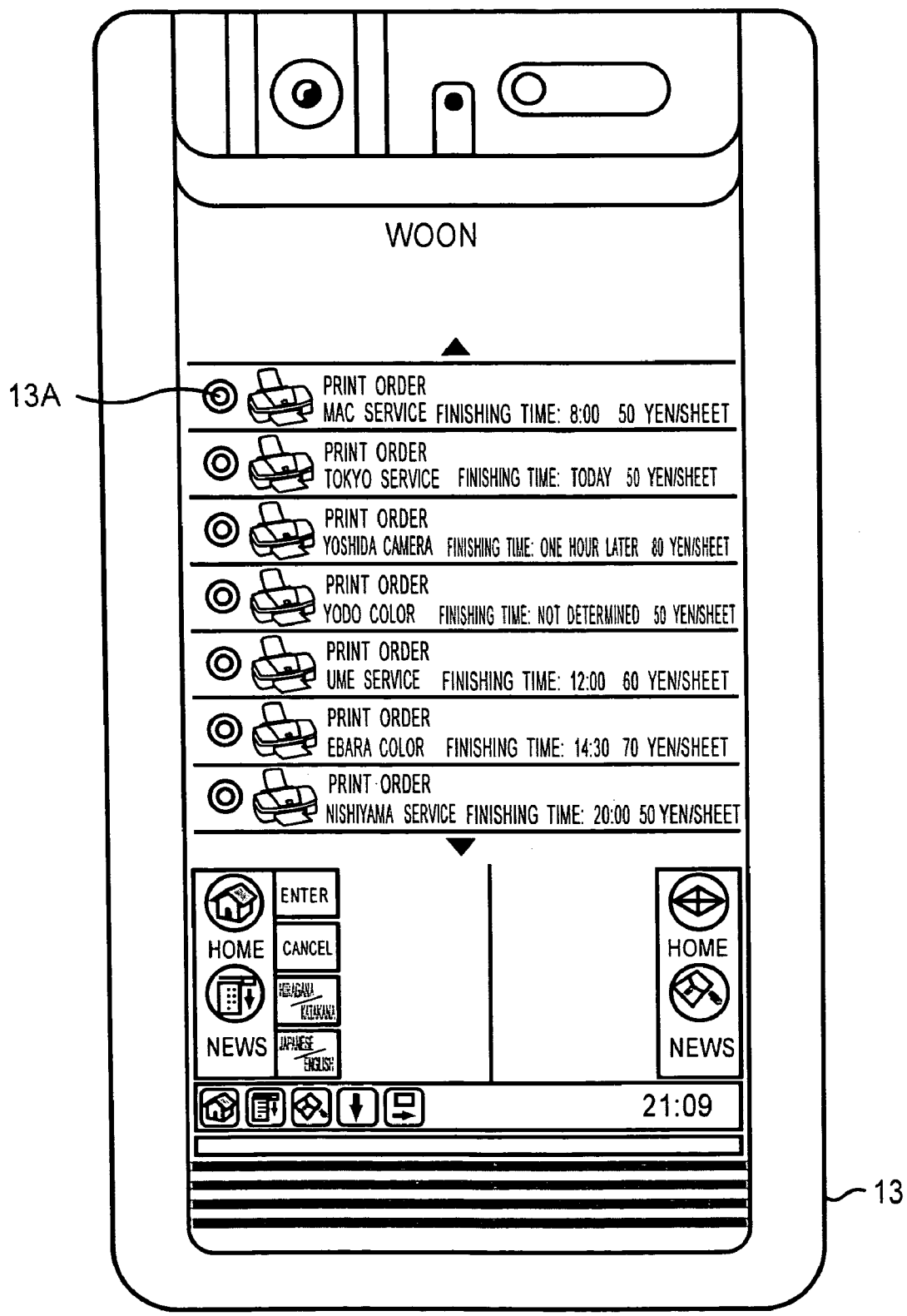
FIG. 11 is a diagram showing an example screen showing a list of service providers.

Thus, according to the present invention, by searching for services provided by servers connected to the Internet 1, a list of service providers can be displayed as a buddy list, for example, as shown in FIG. 11.

In the example shown in FIG. 11, a list of service providers that can be used by a print service application acting as a service consumer on the media IM client #3 implemented on the PDA 13 is shown. In this case, by using the presence function, status of commercial services can be expressed in detail and flexibly in relation to service consumers. For example, in the example shown in FIG. 11, whether or not a commercial service is in operation is indicated by a lamp icon 13A. In this case, for example, a commercial service in operation is indicated by green, and a commercial service not in operation is indicated by red. Furthermore, in the example shown in FIG. 11, detailed status, such as when a requested print will be finished, and a price, is displayed as status information.

Obviously, between applications of service providers and service consumers on user terminals, status can be displayed on an application basis depending on the other party involved, using a user interface and the presence function.

Figure 12:
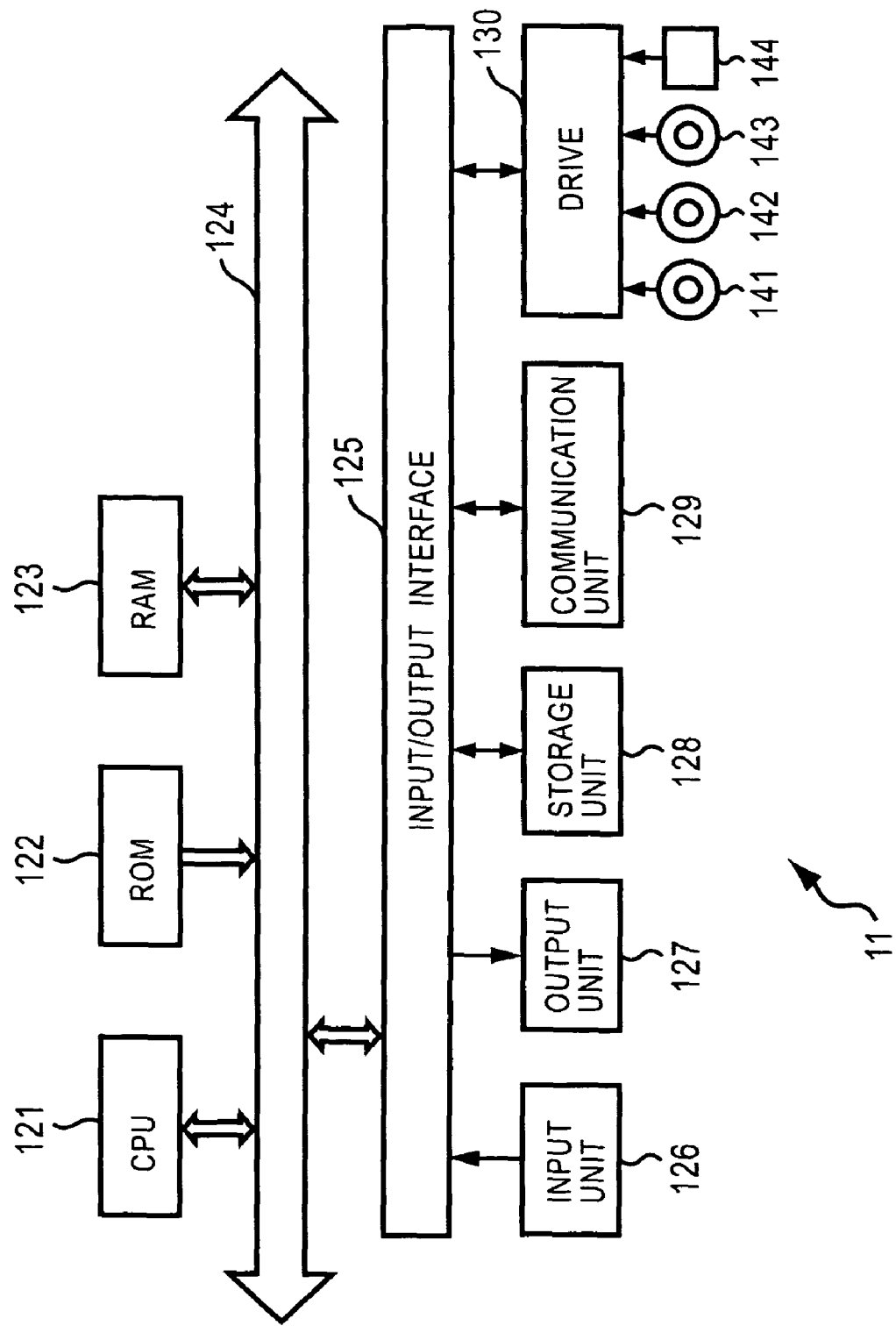
FIG. 12 is a block diagram showing an example configuration of a personal computer.

FIG. 12 shows an example configuration of the personal computer 11. Although not shown, another personal computer 12 is similarly configured. Thus, FIG. 12 is also referred to, when appropriate, as the configuration of the personal computer 12.

Referring to FIG. 12, a CPU (Central Processing Unit) 121 executes various processes according to programs stored in a ROM (Read Only Memory) 122 or programs loaded into a RAM (Random Access Memory) 123 from a storage unit 128. The RAM 123 also stores, as required, data needed by the CPU 121 for executing various processes.

The CPU 121, the ROM 122, and the RAM 123 are connected to each other via a bus 124. The bus 124 is also connected to an input/output interface 125.

The input/output interface 125 is connected to an input unit 126 including a keyboard and a mouse, an output unit including a display implemented by a CRT (Cathode Ray Tube) or an LCD (Liquid Crystal Display) and a speaker, a storage unit 128 implemented by a hard disk or the like, and a communication unit 129 implemented by a modem, a terminal adaptor, or the like. The communication unit 129 executes communication processes via a network including the Internet.

Furthermore, the input/output interface 125 is connected to a drive 130 as required. A magnetic disk 141, an optical disk 142, a magneto-optical disk 143, a semiconductor memory 144, or the like, is mounted as required, and a computer program read therefrom in installed on the storage unit 128 as required.

The application #1 (the service provider 51) and the media IM client #P1, or the application #n (the service consumer 52) and the media IM client #C1, described earlier, are loaded by the CPU 121 to the RAM 123 and are then executed.

Figure 7:
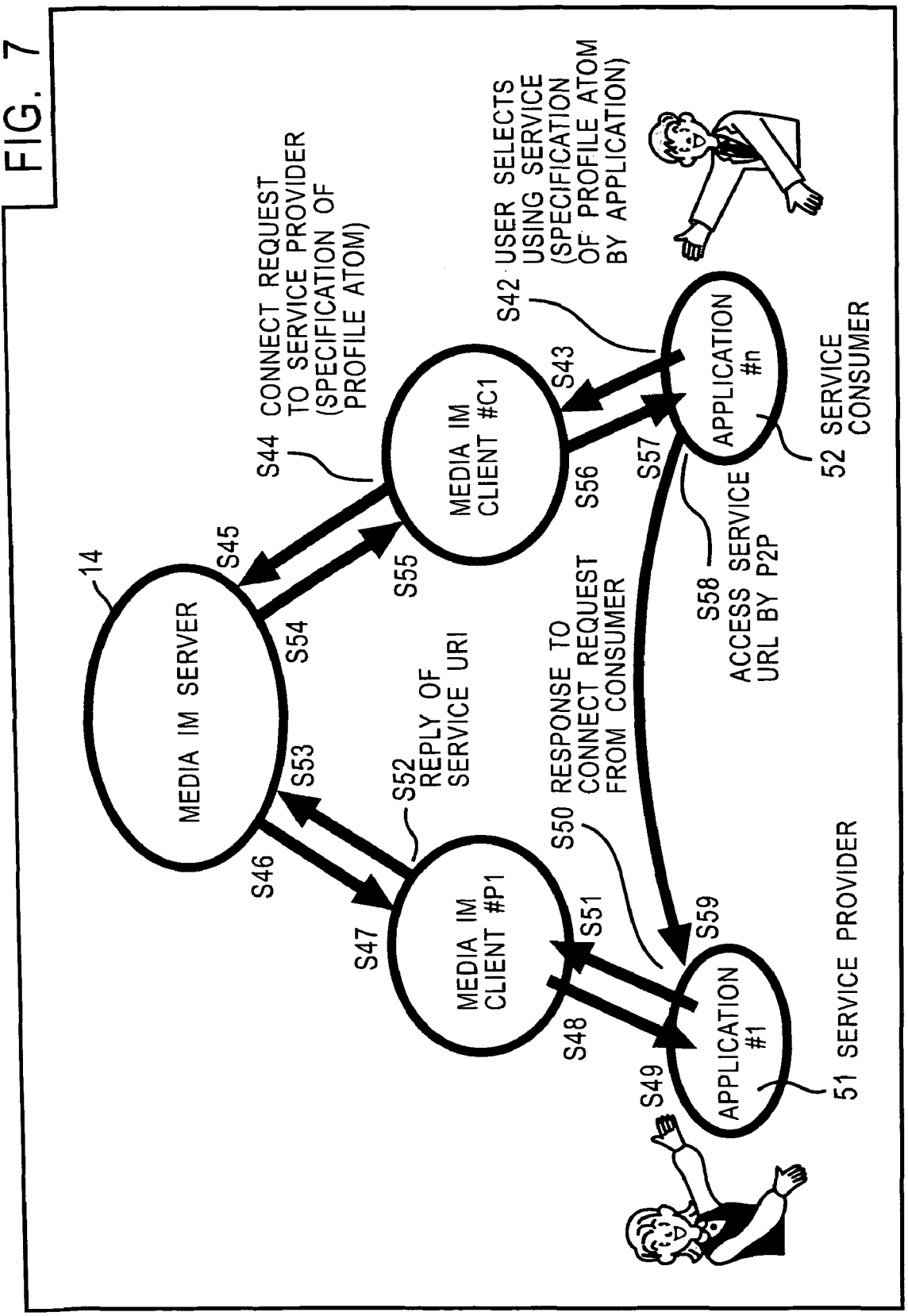
FIG. 7 is a flowchart showing an operation of the network system shown in FIG. 1.

According to what has been described above, the service consumer 52 sends a profile atom to the service provider 51 by the processing in step S42 shown in FIG. 7, allowing use of a service. This is compatible with what is called a pull-type service, for example, a service in which an image captured by a fixed camera is provided from the service provider 51 to the service consumer 52. For example, the service provider 51 that provides an image captured by a fixed camera only has to provide the image based on a request for providing an image, supplied from the service consumer 52 that receives the image provided. Thus, such a service can be readily implemented by the system described above.

However, for example, in the case of what is called a push-type service, such as telephony, in which the service provider 51 actively provides a service to the service consumer 52, the system described above lacks compatibility. For example, when a telephone service is to be implemented by the system described above, the service provider 51 that makes a call is not allowed to make a call until it receives a request from the service consumer 52 that receives the call. Thus, such a service cannot be implemented simply by the system described above.

A procedure that allows a push-type service to be provided will be described below.

Figure 4:
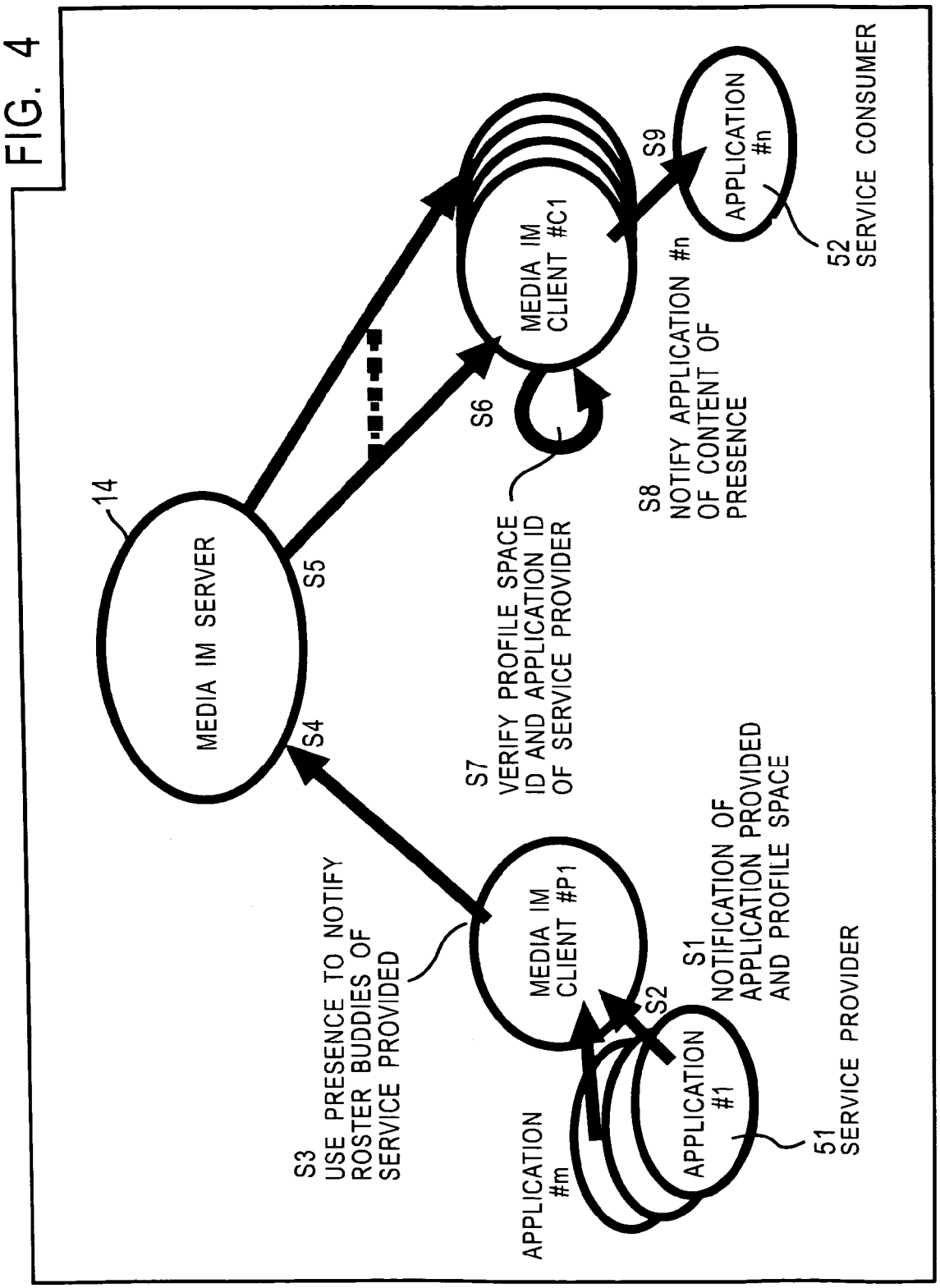
FIG. 4 is a flowchart showing an operation of the network system shown in FIG. 1.
Figure 13:
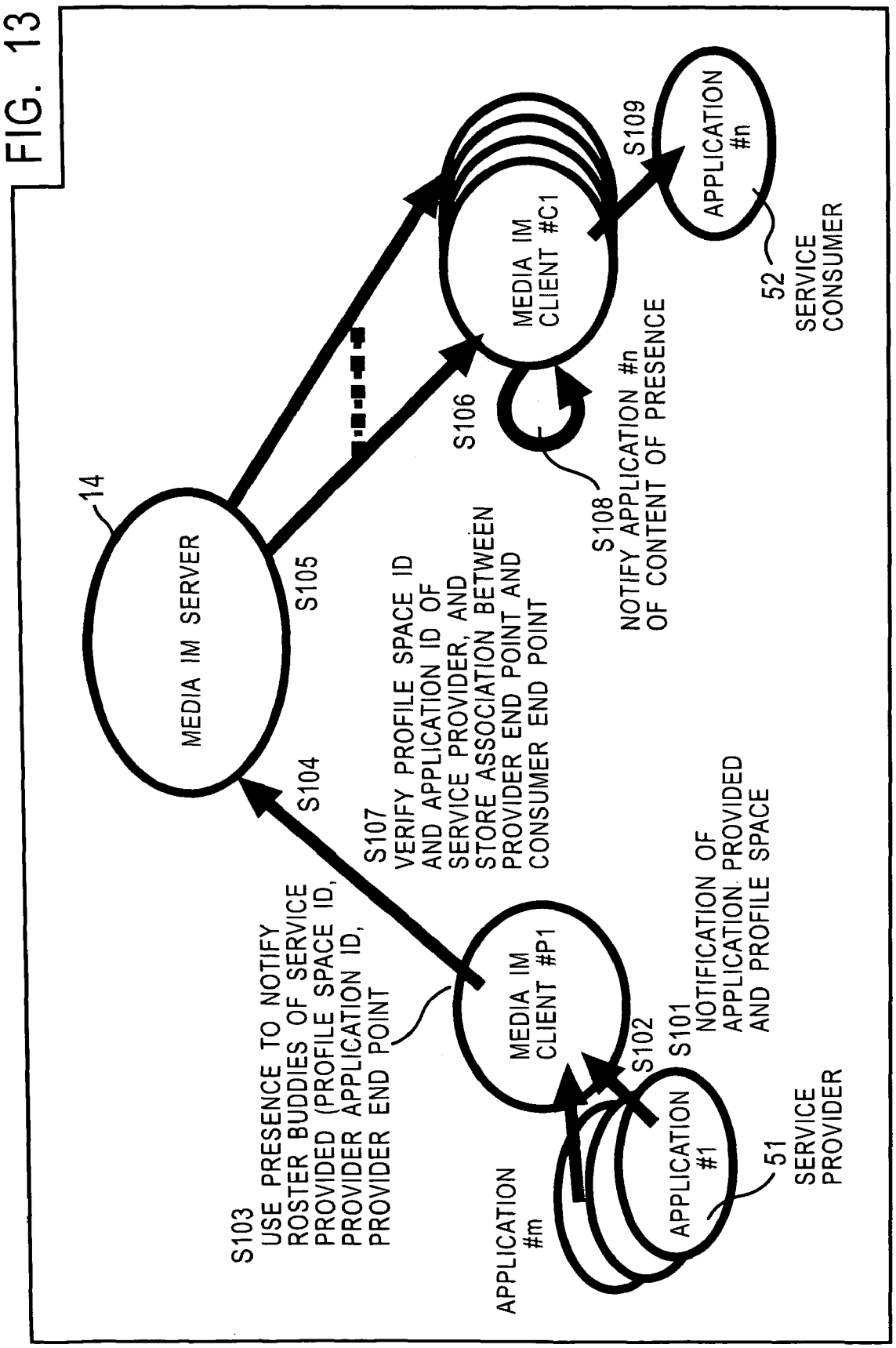
FIG. 13 is a flowchart showing an operation of the network system shown in FIG. 1.

In this case, instead of the processing in steps S1 to S9 shown in FIG. 4, processing in steps S101 to S109 shown in FIG. 13 is executed. The processing in steps S101 to S109 shown in FIG. 13 basically corresponds to the processing in steps S1 to S9 shown in FIG. 4. Thus, the following description will be directed only to the difference therebetween.

What differ from the case shown in FIG. 4 is processing in step S103 corresponding to step S3 shown in FIG. 4 and processing in step S107 corresponding to step S7 shown in FIG. 4.

More specifically, although the media IM client #P1 sends a profile space ID and a provider application ID to the media IM server 14 in step S3, the processing in step S103 additionally sends a provider end point. The provider end point is a provider entity identifier for identifying an entity that acts as a provider that provides a service.

Figure 15:
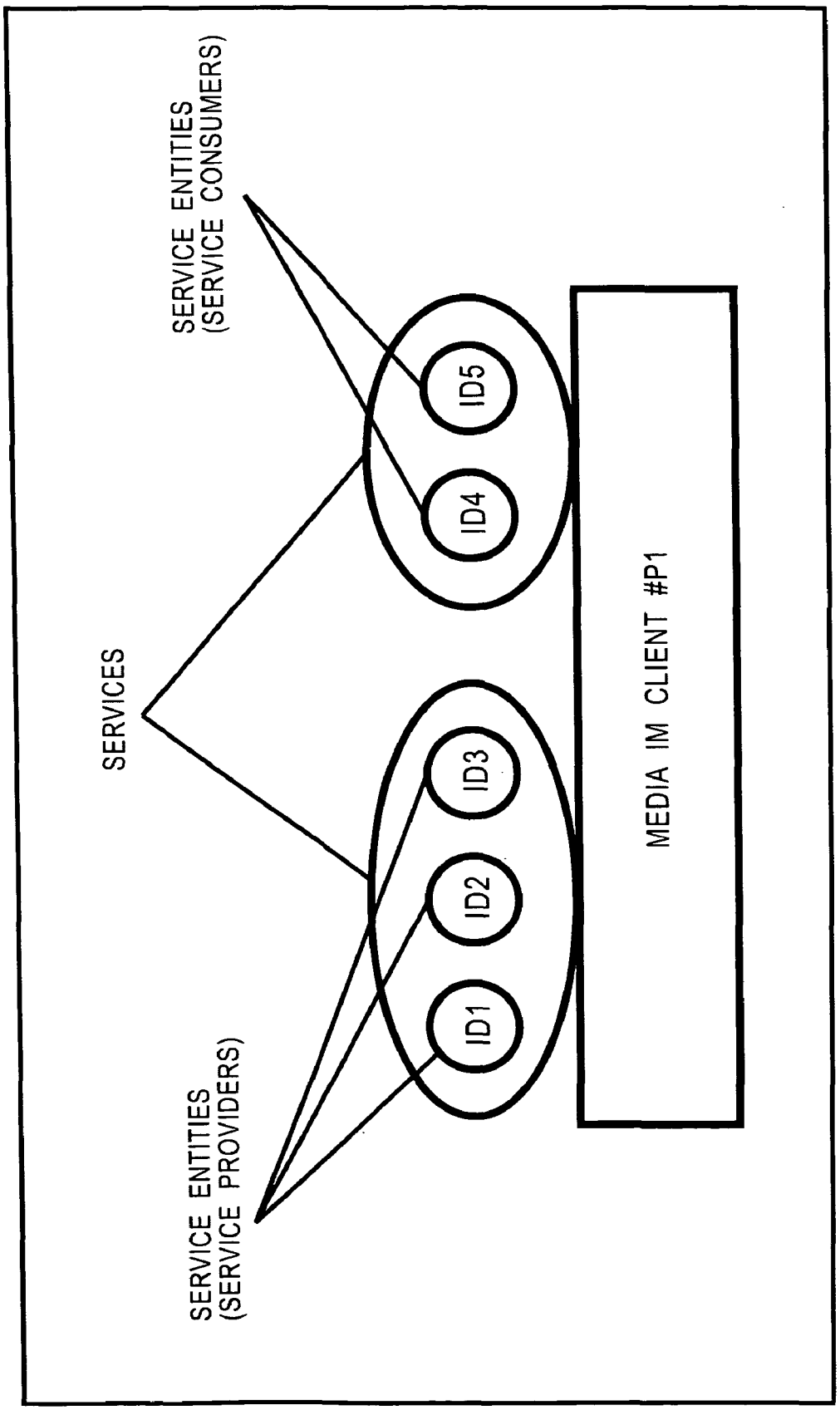
FIG. 15 is a diagram showing service entities.

As will be described later with reference to FIGS. 15 to 17, the application #1 is allowed to have one or more service entities as entities that provide services. A provider end point is an identifier for identifying a target service entity from among the one or more service entities.

Furthermore, although the media client #C1 verifies whether the media IM client #1 is capable of accepting the profile based on the profile space ID and the application ID of the service provider 51 (the ID of the application #1) in step S7 shown in FIG. 4, in addition to the verification, in the processing in step S107, the media IM client #C1 stores association between a provider end point and a consumer end point, included in a notification from the media IM client #P1, received by the processing in step S106. The consumer end point is a user entity identifier for identifying an entity that acts as a user that uses a service.

As will be described later with reference to FIGS. 15 to 17, the application #n is allowed to have one or more service entities as entities that use services. A consumer end point is an identifier for identifying a target service entity from among the one or more service entities.

The other processing is the same as in the case shown in FIG. 4.

Figure 5:
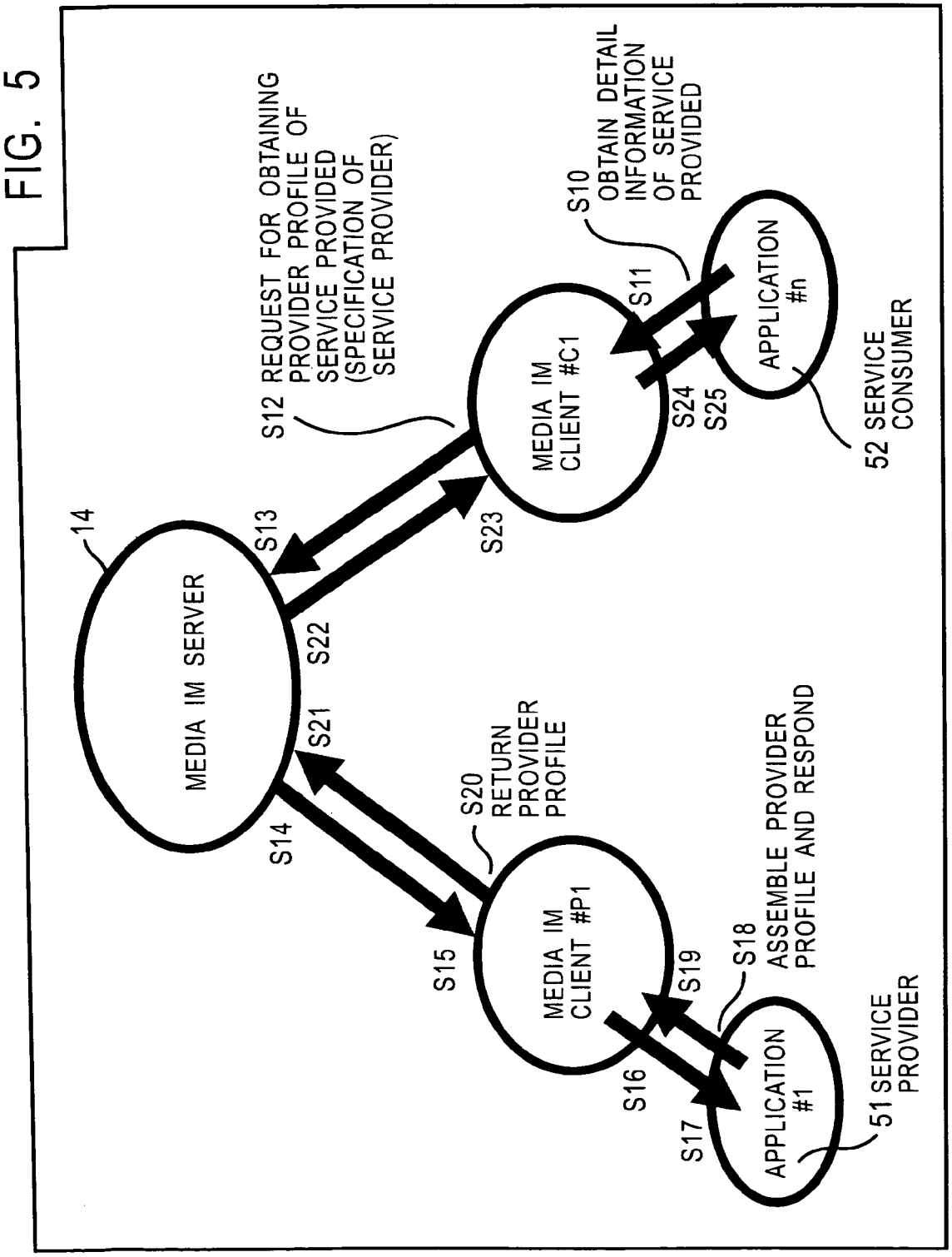
FIG. 5 is a flowchart showing an operation of the network system shown in FIG. 1.

After the processing in steps S101 to S109 shown in FIG. 13 (processing corresponding to steps S1 to S9 shown in FIG. 4) is executed, similarly to the case described earlier, the processing in steps S10 to S25 shown in FIG. 5 is executed. In this case, however, in the processing in step S12, the provider end point stored by the processing in step S107 is included as information specifying a service provider. That is, this allows the service consumer 52 (the application #n) to obtain detailed information of a service provided by the service provider 51 (the application #1).

Figure 6:
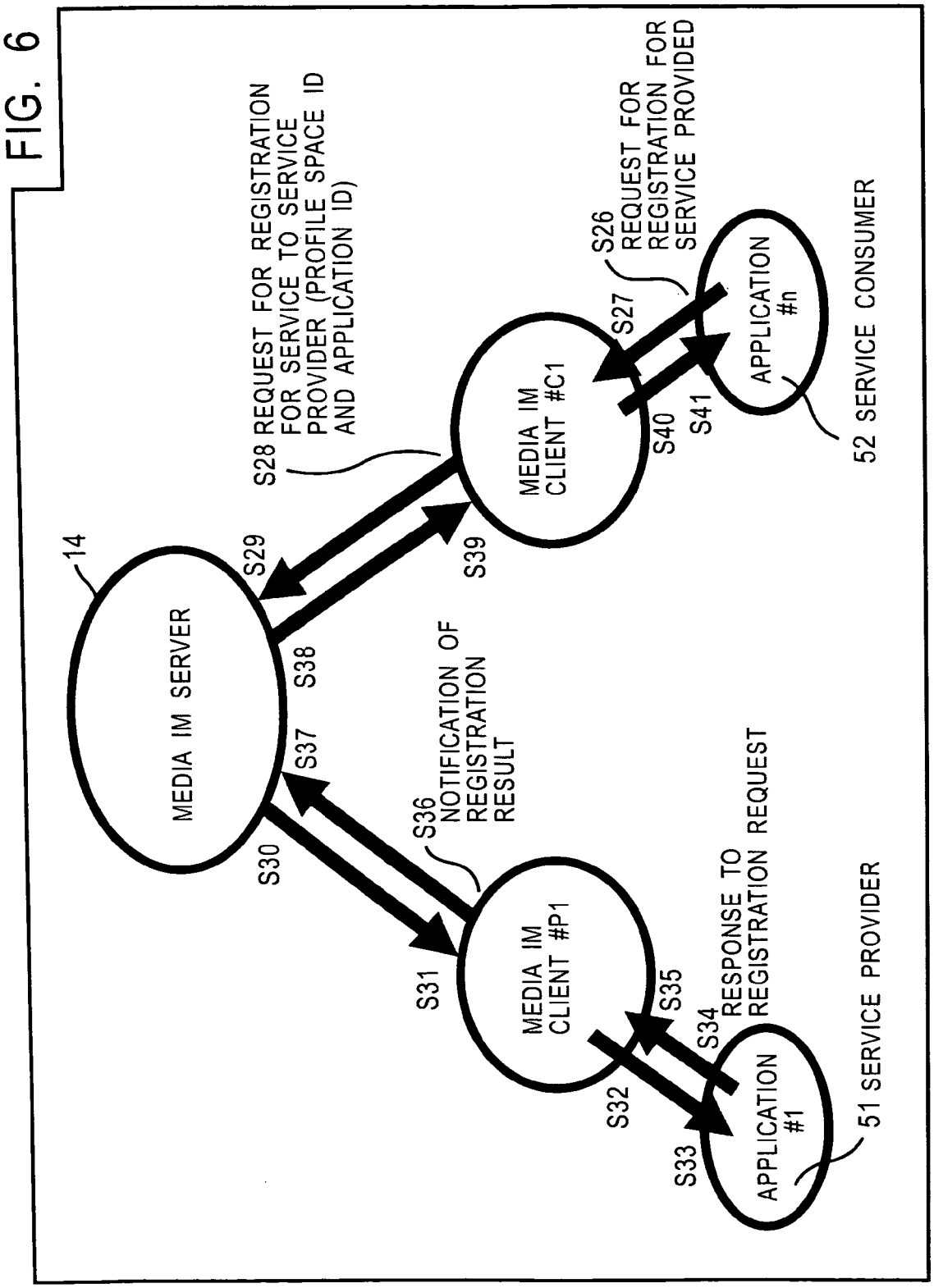
FIG. 6 is a flowchart showing an operation of the network system shown in FIG. 1.
Figure 14:
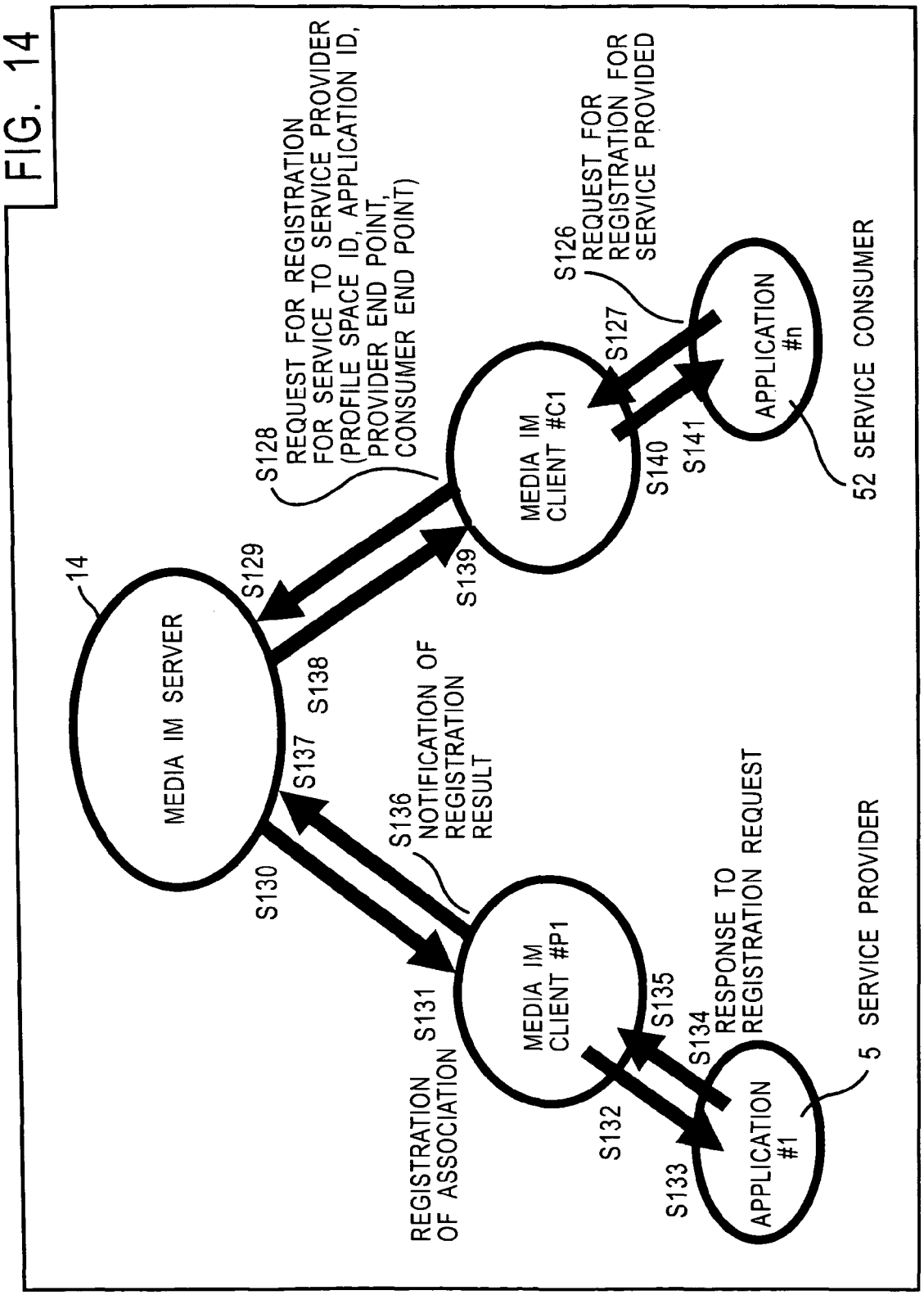
FIG. 14 is a flowchart showing an operation of the network system shown in FIG. 1.

Then, instead of the processing in steps S26 to S41 shown in FIG. 6, processing in steps S126 to S141 shown in FIG. 14 is executed.

The processing in steps S126 to S141 basically corresponds to the processing in steps S26 to S41 shown in FIG. 6. However, processing in step S128 corresponding to step S28 shown in FIG. 6 and processing in step S131 corresponding to step S31 shown in FIG. 6 differ from the processing in step S28 and the processing in step S31 shown in FIG. 6.

The other processing is the same as in the case shown in FIG. 6, so that the following description will be directed only to the processing in step S128 and the processing in step S131.

In the processing in step S28 shown in FIG. 6, the media IM client #C1 issues a request for registration to the service to the application #1, based on a request for registration to the service from the application #n. Although only a profile space ID and an application ID are added to the registration request in the processing in step S28, the processing in step S128 further adds a provider end point and a consumer end point. The provider end point and the consumer end point are those for which association has been stored by the processing in step S107 shown in FIG. 13.

In step S31 shown in FIG. 6, the media IM client #P1, upon receiving a request from the media IM server 14, only sends the request to the application #1 in step S32. In contrast, in the processing in step S131, the media IM client #P1, upon receiving a request from the media IM server 14, executes a process of reading a provider end point and a consumer end point included therein and registering these end points in association with each other.

As described above, at both the media IM client #C1 (the processing in step S107 shown in FIG. 13) and the media IM client #P1 (step S131 shown in FIG. 10), association between a provider and point and a consumer end point is stored. The other processing is the same as in the case shown in FIG. 6.

Next, service entities will be described with reference to FIGS. 15 to 17. FIG. 15 schematically shows a state where service provider entities and service consumer entities have been registered by the media IM client #P1 through step S131 described above. In this example, three service provider entities represented by ID1 to ID3 and two service consumer entities represented by ID4 and ID5 are registered at the media IM client #P1.

Figure 16:
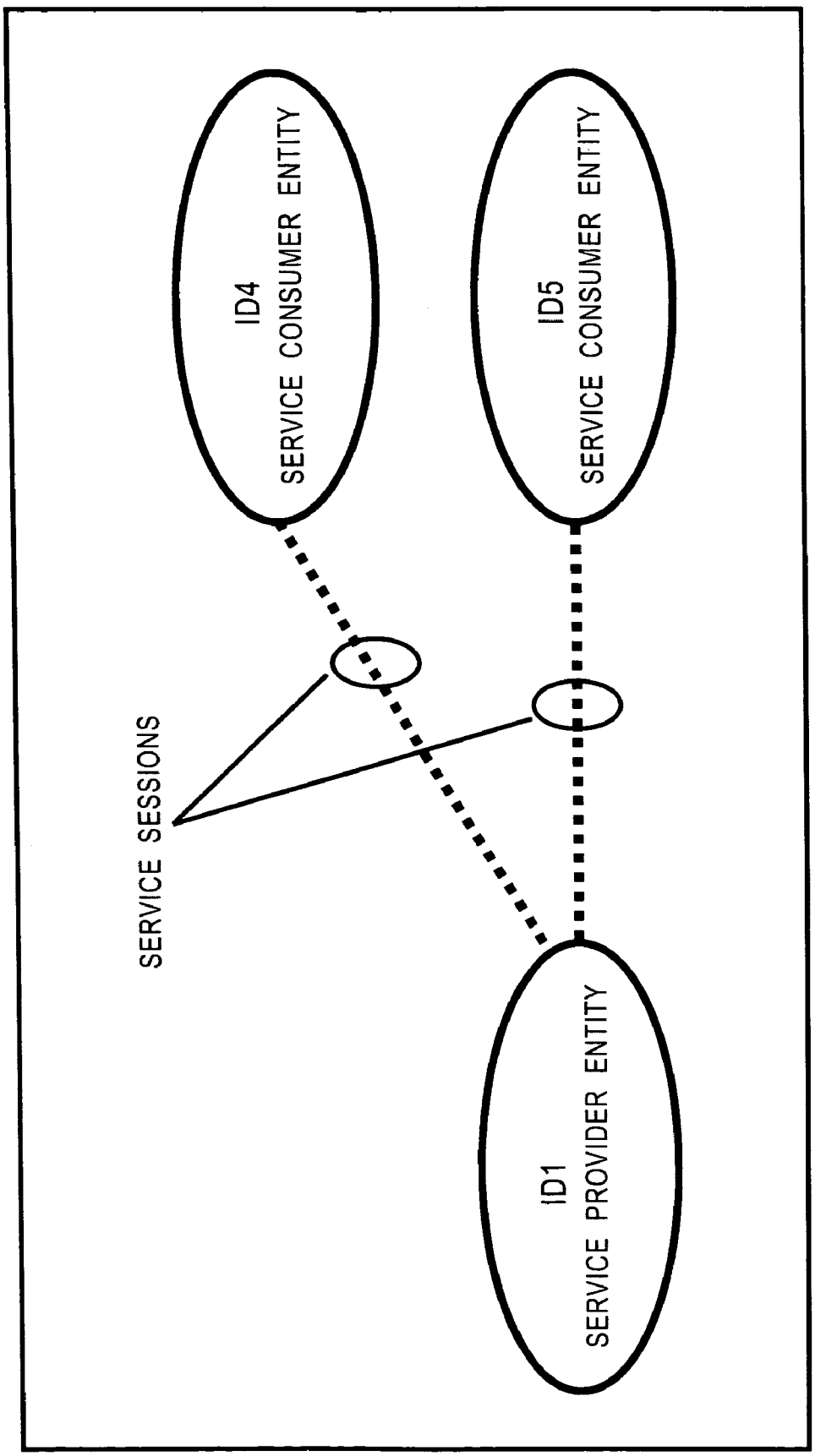
FIG. 16 is a diagram showing a relationship between a service provider entity and service consumer entities.

As shown in FIG. 16, one service provider entity represented by ID1 is associated with two service consumer entities represented by ID4 and ID5.

Figure 17:
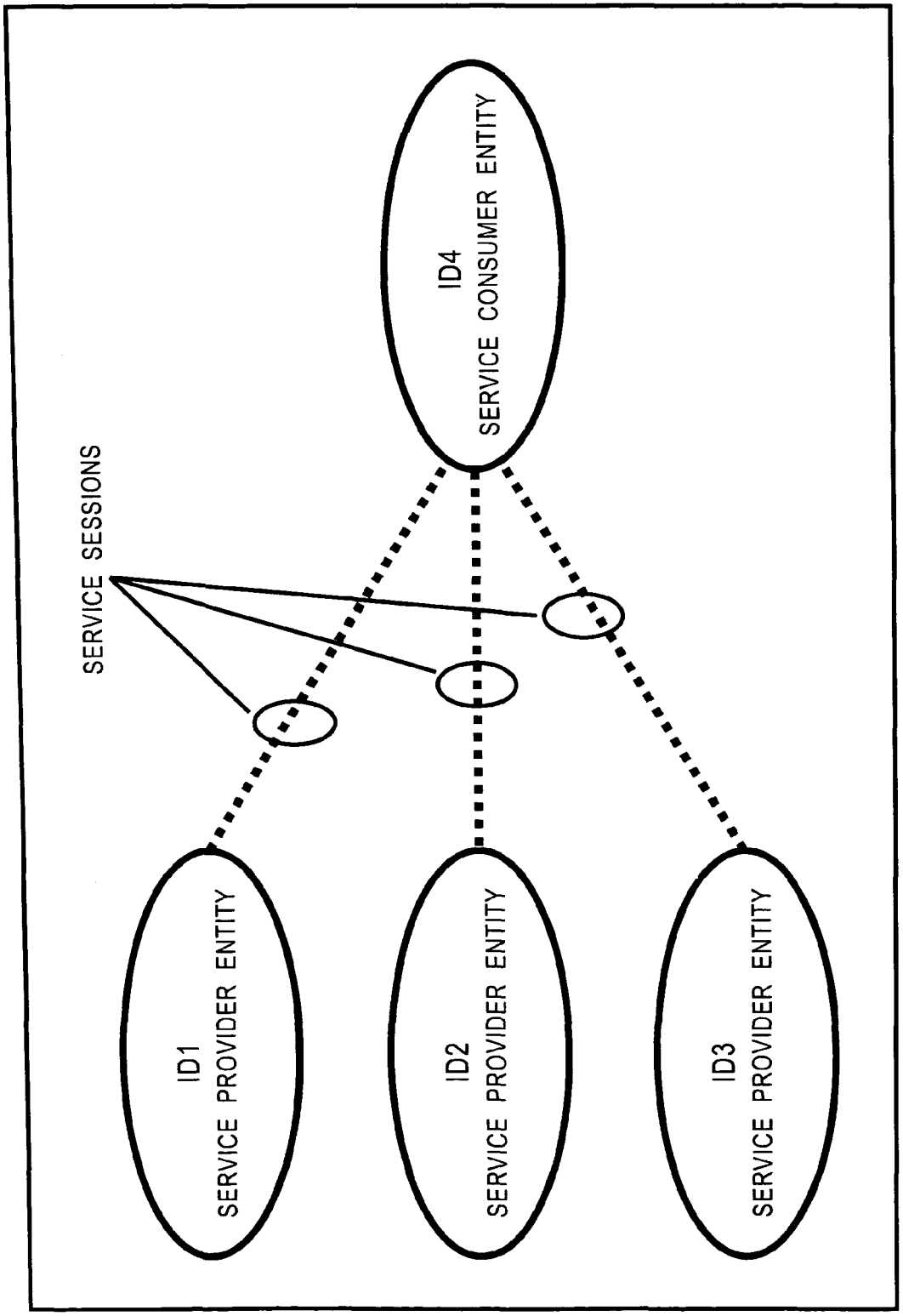
FIG. 17 is a diagram showing a relationship between service provider entities and a service consumer entity.

Furthermore, as shown in FIG. 17, one service consumer entity represented by ID4 is associated with three service consumer entities ID1, ID2, and ID3.

In these figures, the associations are indicated as service sessions.

A service entity is an entity that provides or uses a service, and the application #1 (and also the application #n) is allowed to have one or more service entities. That is, usually, the application #1 is allowed to provide more than one services. The application #1 is allowed to provide one or more services. Similarly, the application #n usually uses not only one but two or more services. For example, in the case of a telephone application, a service of exchanging audio and video and a service of exchanging text can be provided between a service provider and a service consumer. Thus, the application ID cannot be used as a service ID, and a service entity as an entity representing a service is defined separately from the application.

When the registration process shown in FIG. 14 is complete, processing in steps S201 to S212 shown in FIG. 18 is further executed prior to processing in steps S142 to S159 (connect-request process) shown in FIG. 21, which will be described later.

In step S201, the application #1 requests, based on an instruction by a user, invocation of a method for prompting (inviting) a service consumer specified by a user to use a service provided by the application #1. This invitation process, in the case of a telephone application, corresponds to a process of making a call to a telephone of the other party. Upon receiving the request from the application in step S202, the media IM client #P1, in step S203, sends Invite method for prompting the service consumer specified to use the service (access the service), using the messaging function or the Info/Query function of instant messaging.

The Invite method includes a reference number for identifying the method (Invite Reference), and also includes the provider end point and the consumer end point, registered by the processing in step S131.

A method is a term in object-oriented programming, meaning an operation on an object having "data" and "procedure" (i.e., an operation that invokes execution of the "procedure" of the object). That is, Invite method in this case is a method that invokes the media IM client #C1 to execute a "service usage" procedure of the media IM client #C1.

As described above, the media IM client #P1 adds to Invite method a provider end point identifying a service provider entity that provides a service of interest and a consumer end point identifying a service consumer entity that uses the service. Accordingly, the media IM client #C1 is allowed to accurately identify a service entity of interest from among a plurality of service entities.

Furthermore, by including Invite Reference in Invite method, as will be described later with reference to FIG. 19, Invite method of interest can be identified when a service provider cancels Invite method it has issued or when a consumer responds to Invite method by Accept method or Reject method as will be described with reference to FIG. 20.

In step S203, the media IM client #P1 may alternatively send Invite method to all the service consumers that have been registered based on requests for registration to service from the application #n in step S126 shown in FIG. 14, instead of sending Invite method to a service consumer specified by the application #1.

Upon receiving Invite method transmitted from the media IM client #P1 in step S204, the media IM server 14 sends Invite method to the media IM client #1.

Upon receiving Invite method transmitted from the media IM server 14 in step S206, the media IM client #C1 notifies the application #n of Invite method in step S207. Upon receiving the notification from the media IM client #C1 in step S208, the application #n notifies the user of the service consumer 52 (service users) of the notification, using video, audio, GUI (Graphical User Interface), or the like.

Furthermore, even when the application #n is not allowed to communicate as it is, for example, when the application #n is in a wait state although it is activated, not executing operation other than a wait operation, or when the application #n is not activated, the media IM client #C1 may control the operation status of the application #n by activating the application #n or controlling the operation of the application #n, allowing the application #n to obtain notification information supplied from the application #1. Accordingly, users are allowed to receive notifications reliably.

Upon receiving Invite method from the media IM server 14 in step S206, the media IM client #C1, in step S209, issues a notification of reception as a result of Info/Query function. Upon receiving the notification from the media IM client #C1 in step S210, the media IM server 14, in step S211, further sends the notification to the media IM client #P1. The media IM client #P1 receives this notification in step S212. Thus, the media IM client #P1 is allowed to know that the message based on the Info/Query function, issued in step S203, has been properly received by the media IM client #C1.

As described earlier, in data exchange based on the messaging function, a destination of data does not send a response to transmission of the data to a source of the data. That is, the media IM client #C1, even if it obtains data sent by the messaging function, does not send a response to the data (notification that the data has been received). Thus, when Invite method is sent using the messaging function, a notification based on the Info/Query function is not issued.

As described above, the user of the application #1 is allowed to push a service to the user (consumer) of the application #n.

In this system, the service provider 51 is allowed to cancel an invitation that has once been issued. A process executed in that case will be described with reference to FIG. 19. The cancellation process corresponds, for example, in the case of a telephone application, to a process in which a caller quits a call while calling up a party to be called.

This process can be executed by the service provider 51 after Invite method shown in FIG. 18 is issued and before Accept or Reject method is transmitted from a consumer as will be described later with reference to FIG. 20.

The user of the application #1 acting as the service provider 51, if the user wishes, for some reason, to cancel Invite method it has issued to the service consumer 52 by the processing shown in FIG. 18, instructs the wish to the application #1. Upon receiving the instruction from the user, the application #1, in step S231, instructs the media IM client #P1 to cancel the invitation.

Upon receiving the instruction for cancellation of invitation from the application #1 in step S232, the media IM client #P1, in step S233, issues Cancel method using the messaging function or the Info/Query function. Cancel method includes a reference number (Invite Reference) for identifying Invite method relating to the cancellation. Furthermore, Cancel method includes a provider end point for identifying a service provider entity concerned and a consumer end point for identifying a service consumer entity concerned. Thus, even if a plurality of Invite methods exists, what is to be cancelled can be accurately identified.

Upon receiving Cancel method from the media IM client #P1 in step S234, the media IM server 14, sends Cancel method to the media IM client #C1 in step S235. Upon receiving Cancel method in step S236, the media IM client #C1 identifies an invitation canceled based on a provider end point, a consumer end point, and a reference number (Invite Reference), and in step S237, notifies the application #n that the invitation has been canceled. Upon receiving the notification of cancellation from the media IM client #C1 in step S238, the application #n notifies the user that the invitation has been cancelled, using video, audio, GUI, or the like, similarly to the case where an invitation is received.

In step S239, the media IM client #C1, using the Info/Query function, notifies the media IM server 14 that Cancel method has been received from the media IM server 14. Upon receiving the notification of the result of the Info/Query in step S240, the media IM server 14 sends the notification to the media IM client #P1 in step S241. In step S242, the media IM client #P1 receives the notification from the media IM server 14. Thus, the media IM client #P1 is allowed to confirm that Cancel method invoked in step S233 has been properly received by the media IM client #C1.

The user of the service consumer 52, when it has received the notification of cancellation by the processing shown in FIG. 19 and described above, is not allowed to reply to an invitation described later with reference to FIG. 20. Thus, the service provider 51, when it issues Cancel method after issuing Invite method shown in FIG. 18, does not have to wait so that a reply from the service consumer 52 can be received. On the other hand, the service provider 51, when it does not issue Cancel method after issuing Invite method shown in FIG. 18, waits so that a reply from the service consumer 52 can be received.

Next, a reply process executed by the service consumer 52 having received Invite method by the processing shown in FIG. 18 will be described with reference to FIG. 20. This reply process, for example, in the case of a telephone application, corresponds to a process in which a receiver responds to a telephone call.

When a notification that Invite method has been received is received via the application #n, the user of the service consumer 52 replies to the notification. The user instructs the application #n to either accept or reject the invitation.

Upon receiving the instruction of reply of acceptance or rejection from the user, the application #n, in step S261, requests the media IM client #C1 to invoke a method corresponding to the reply. Upon receiving the instruction from the application #n in step S262, the media IM client #C1, in step S263, sends a reply to the instruction from the application #n. If the instruction from the application #n instructs acceptance, the media IM client #C1 invokes Accept method, while invoking Reject method if the instruction instructs rejection. In either of these methods, a reference number (Invite Reference) for identifying Invite method concerned is included. Furthermore, the Accept method or Reject method includes a provider end point for identifying a provider service entity concerned and a consumer end point for identifying a consumer service entity concerned.

The media IM client #1 invokes the Accept method or Reject method using the messaging function or the Info/Query function of IM.

Upon receiving the Accept method or Reject method from the media IM client #C1 in step S264, the media IM server 14 sends the method to the media IM client #P1 in step S265.

Upon receiving the Accept method or Reject method from the media IM server 14 in step S266, the media IM client #P1 identifies which invitation the reply relates to based on a provider end point, a consumer end point, and a reference number (Invite Reference) included in the Accept method or Reject method, and in step S267, notifies the application #1 that a reply relating to the invitation issued by the processing in step S201 has been received from the service consumer 52.

In step S268, upon receiving the reply from the media IM client #P1, the application #1 notifies the user of the service provider 51 that the invitation has been accepted (when Accept method is received) or rejected (when Reject method is received).

Thus, the user of the service provider 51 is allowed to know the result of reply by the user of the service consumer 52 to the invitation issued.

Upon receiving the Accept method or Reject method from the media IM server 14 by the processing in step S266, the media IM client #P1, in step S269, issues a notification of the result of Info/Query to the media IM server 14, indicating reception. Upon receiving the notification from the media IM client #P1 in step S270, the media IM server 14 sends the notification to the media IM client #C1 in step S271. In step S272, the media IM client #C1 receives the notification from the media IM server 14. Thus, the media IM client #C1 is allowed to confirm that the Accept method or Reject method issued in step S263 has been received by the media IM client #P1.

If the user of the service consumer 52 instructs acceptance of the invitation by the processing described above, the application #1 waits for a subsequent connection request from the application #n. Then, the user of the service consumer 52 executes processing in steps S142 to S159 shown in FIG. 21 instead of the processing in steps S42 to S59 shown in FIG. 7 (executes a connection request) to use the service provided by the service provider 51.

The processing in steps S142 to S159 basically corresponds to the processing in steps S42 to S59 shown in FIG. 7; however, processing in step S144, which corresponds to step S44 shown in FIG. 7, differs from the processing in step S44 shown in FIG. 7.

The other processing is the same as in the case shown in FIG. 7, so that the following description will be directed only to the processing in step S144.

In the processing in step S44 shown in FIG. 7, the media IM client #C1 sends a connection request from the application #n, using the messaging function or the Info/Query function, to the service provider 51. Although only a specification of profile atom is attached to the connection request in the processing in step S44, in the processing in step S144, a provider end point and a consumer end point are additionally attached.

The association between the provider and point and the consumer end point has already been stored both at the media IM client #C1 (the processing in step S107 shown in FIG. 13) and the media IM client #P1 (step S131 shown in FIG. 10), so that, in step S148 shown in FIG. 21, the present invention is allowed to pass the connection request correctly to the application #1 acting as the service provider. The other processing is the same as in the case shown in FIG. 7.

On the other hand, when the user of the service consumer 52 has made a response of rejection to the invitation from the service provider 51, then, the process of connection request shown in FIG. 21 need not be executed.

Furthermore, when a response of rejection has been received from the service consumer 52, the service provider 51 need not wait for a connection request from the service consumer 52.

Thus, it becomes possible to carry out push-type communication reliably.

Although media IM clients and applications have been described above as separate, media IM clients and applications may be integrated.

According to the present invention, a service consumer is notified of identification information by a service provider. Thus, the service consumer is allowed to readily and quickly determine, based on the notification, whether it is possible for the service consumer to use a function of the service provider.

Furthermore, compared with a case where a notification of detailed information is issued at the beginning, the service consumer is allowed to readily and quickly determine whether the service can be used. Furthermore, the load of traffic on a transmission path between the service provider and the service consumer is reduced.

Since a notification that the service consumer has been registered for the service is issued, the service consumer is notified that the service can be used.

Since the service consumer is notified of connection information, direct communication with the service consumer is allowed.

When an access based on the connection information is accepted, it becomes possible to actually communicate with the service consumer.

By using the presence function for the notification of identification information and using the messaging function or the Info/Query function for the notification of the detailed information and the notification of the connection information, notifications by instant messaging are allowed.

By issuing a notification of a provider entity identifier, a plurality of services can be managed.

By registering the provider entity identifier and a user entity identifier such that these identifiers are associated with each other, a service can be managed on a basis of association between an entity that provides the service and an entity that uses the service.

By sending invitation information, a push-type service can be provided.

By sending the invitation information using the messaging function or the Info/Query function, invitation information can be sent using instant messaging.

By sending the invitation information in association with the user entity identifier that has been registered, a more efficient service can be provided.

By sending cancellation information for canceling the invitation, it becomes possible to deal with changes in situation.

By sending the cancellation information using the messaging function or the Info/Query function, cancellation information can be sent using instant messaging.

By including a reference number, the provider entity identifier, and the user entity identifier in the cancellation information, it becomes possible to cancel the invitation information specifically and reliably.

Furthermore, according to the present invention, by receiving identification information, a service of a service provider can be identified without receiving detailed information from the beginning.

Furthermore, by requesting sending of detailed information based on the identification information, the load of traffic to the service provider is reduced.

By requesting registration of itself to the service, the service can be used more efficiently.

By sending information regarding use of a service that can be provided to the service provider, it becomes possible to receive the service reliably from the service provider.

By receiving connection information for directly connecting to the provider, it becomes possible to receive the service directly from the service provider.

By making an access based on the connection information, it becomes possible to exchange information directly with the service provider.

The request for sending of detailed information, the request for registration of itself, and the sending of information regarding use of the service that can be provided may use the messaging function or the Info/Query function, allowing use of instant messaging.

By receiving a provider entity identifier together with the identification information, the provider entity identifier and a user entity identifier can be stored such that these identifiers are associated with each other, allowing management of use of a plurality of services based on what has been stored.

By receiving invitation information, a push-type service can be received.

By sending information indicating acceptance or rejection of the invitation information, the invitation information can be accepted or rejected at an own will.

By sending acceptance or rejection of the invitation information using the messaging function or the Info/Query function, use of instant messaging is allowed.

By sending the information regarding use of the service that can be provided, on condition that information indicating acceptance has been sent, meaningless sending of the information regarding the service that can be provided is prevented.

By including a reference number, the provider entity identifier, and the user entity identifier in the information indicating acceptance or rejection, it becomes possible to accurately identify a service to be accepted or rejected.

By implementing both functions of a service provider and functions of a service consumer, it becomes possible to provider a service or conversely use a service as needed.

The services described above can be applied to cases where various information, such as video data, audio data, and other data is exchanged, and also to cases where various services are exchanged.

Furthermore, various information processing apparatuses can be used, without limitation to consumer electronics (CE) devices such as personal computers and PDAs.

The processing described above may be executed by hardware in the case of network-enabled CE equipment or the like. Obviously, the processing may be executed by software.

When the series of processes are executed by software, programs constituting the software are installed from a network or a recording medium onto a computer included in special hardware, a general-purpose computer or the like that is capable of executing various functions with various programs installed thereon.

The recording medium may be a package media carrying the programs, provided to a user for providing programs separately from a main unit of the apparatus, such as a magnetic disk 141 (including a floppy disk), an optical disk 142 (including a CD-ROM (Compact Disk-Read Only Memory) and a DVD (Digital Versatile Disk)), a magneto-optical disk 143 (including an MD (Mini-Disk)), or a semiconductor memory 144. Alternatively, the recording medium may be the ROM 122 or a hard disk included in the storage unit 128, carrying the programs, provided as included in advance in the main unit of the apparatus.

In this specification, steps defining the programs recorded on the recording medium may include processes that are executed sequentially in the orders described, and also include processes that are executed in parallel or individually, not necessarily sequentially.

In this specification, a system refers to the entirety of apparatuses constituted of a plurality of apparatuses.

INDUSTRIAL APPLICABILITY

As described hereinabove, according to the present invention, a service can be exchanged between information processing apparatuses. In particular, a connection can be established reliably and a service can be exchanged between apparatuses having different capabilities, quickly and readily without imposing a burden on a user.

The invention claimed is:

1. A non-transitory computer readable medium including stored thereon a program for allowing a computer to execute a method of exchanging information with a first information processing apparatus via a network, the method comprising:

sending, from the computer, a notification to the first information processing apparatus, via a second information processing apparatus on the network, the notification including identification information for identifying a service provided by the computer;

sending, from the computer, a second notification to the first information processing apparatus, via the second information processing apparatus, in response to a first request from the first information processing apparatus, the second notification including detailed information regarding the service provided by the computer;

sending, from the computer, a third notification to the first information processing apparatus, via the second information processing apparatus, in response to a second request from the first information processing apparatus, the third notification including information indicating that the first information processing apparatus has been registered for the service provided by the computer and the second information processing apparatus isolating the computer and the first information processing apparatus such that communication between the computer and the first information processing apparatus is enabled only as indirect communication until at least the first information processing apparatus has been registered for the service provided by the computer; and sending, from the computer, a fourth notification to the first information processing apparatus, via the second information processing apparatus, in response to a third request from the first information processing apparatus, the fourth notification including connection information enabling the first information processing apparatus that has been registered to establish a direct connection to the computer without connecting to the second information processing apparatus, the computer, the first information processing apparatus, and the second information processing apparatus being distinct apparatuses.

2. The computer readable medium according to claim 1, further comprising:

an accepting step of accepting an access that is made based on the connection information by the first information processing apparatus that has been registered, without connecting to the second information processing apparatus.

3. The computer readable medium according to claim 1, wherein the first notification uses a presence function of instant messaging, and wherein the second notification, the third notification and the fourth notification use a messaging function or an Info/Query function of instant messaging.

4. The computer readable medium according to claim 1, wherein the first notification further includes a notification of a provider entity identifier for identifying an entity that acts as a provider who provides the service.

5. The computer readable medium according to claim 4, further comprising:
   a registering step of registering the provider entity identifier and a user entity identifier for identifying an entity that acts as a user who uses the service associated with the provider entity identifier, such that the provider entity identifier and the user entity identifier are associated with each other, when a request for registering the first information processing apparatus for the service that can be provided has been transmitted from the first information processing apparatus together with the user entity identifier.

6. The computer readable medium according to claim 5, further comprising:
   a first sending step of sending invitation information for inviting the entity associated with the user entity identifier to use the service.

7. The computer readable medium according to claim 6, wherein the first sending step sends the invitation information using a messaging function or an Info/Query function of instant messaging.

8. The computer readable medium according to claim 6, wherein the first sending step sends the invitation information to the user associated with the user entity identifier registered by the processing in the registering step.

9. The computer readable medium according to claim 6, further comprising:
   a second sending step of sending cancellation information for canceling the invitation for using the service after the invitation information is sent by the processing in the first sending step.

10. The computer readable medium according to claim 9, wherein the second sending step sends the cancellation information using a messaging function or an Info/Query function of instant messaging.

11. The computer readable medium according to claim 9, wherein, in the second sending step, a reference number for identifying the cancellation information, the provider entity identifier, and the user entity identifier are included in the cancellation information.

12. An information processing method for an information processing apparatus for exchanging information between a computer and a first information processing apparatus via a network, the information processing method comprising:
   sending, from the computer, a notification to the first information processing apparatus, via a second information processing apparatus on the network, the notification including identification information for identifying a service provided by the computer;
   sending, from the computer, a second notification to the first information processing apparatus, via the second information processing apparatus, in response to a first request from the first information processing apparatus, the second notification including detailed information regarding the service provided by the computer;
   sending, from the computer, a third notification to that the first information processing apparatus, via the second information processing apparatus, in response to a second request from the first information processing apparatus, the third notification including information indicating that the first information processing apparatus has been registered for the service provided by the computer and the second information processing apparatus isolating the computer and the first information processing apparatus such that communication between the computer and the first information processing apparatus is enabled only as indirect communication until at least the first information processing apparatus has been registered for the service provided by the computer; and
   sending, from the computer, a fourth notification to the first information processing apparatus, via the second information processing apparatus, in response to a third request from the first information processing apparatus, the fourth notification including connection information enabling the first information processing apparatus that has been registered to directly connect to the computer without connecting to the second information processing apparatus, the computer, the first information processing apparatus, and the second information processing apparatus being distinct apparatuses.

13. An information processing apparatus for exchanging information with a first information processing apparatus via a network, the information processing apparatus comprising:
   first notifying means for sending, from the information processing apparatus, a notification to the first information processing apparatus, via a second information processing apparatus on the network, the notification including identification information for identifying a service provided by the information processing apparatus;
   second notifying means for sending, from the information processing apparatus, a second notification to the first information processing apparatus, via the second information processing apparatus, in response to a first request from the first information processing apparatus, the second notification including detailed information regarding the service provided by the information processing apparatus; and
   third notifying means for sending, from the information processing apparatus, a third notification to the first information processing apparatus, via the second information processing apparatus, in response to a second request from the first information processing apparatus, the third notification including information indicating that the first information processing apparatus has been registered for the service provided by the information processing apparatus and the second information processing apparatus isolating the information processing apparatus and the first information processing apparatus such that communication between the information processing apparatus and the first information processing apparatus is enabled only as indirect communication until at least the first information processing apparatus has been registered for the service provided by the information processing apparatus, and for sending, from the information processing apparatus, a fourth notification to the first information processing apparatus, via the second information processing apparatus, in response to a third request from the first information processing apparatus, the fourth notification including connection information enabling the first information processing apparatus that has been registered to directly connect to the information processing apparatus without connecting to the second information processing apparatus, the information processing apparatus, the first information processing apparatus, and the second information processing apparatus being distinct apparatuses.

14. A non-transitory computer readable medium including stored thereon a program for allowing a computer to execute a process for exchanging information with a first information processing apparatus via a network, the program comprising:

sending, from the computer, a notification to the first information processing apparatus, via a second information processing apparatus on the network, the notification including identification information for identifying a service provided by the computer;

sending, from the computer, a second notification to the first information processing apparatus, via the second information processing apparatus, in response to a first request from the first information processing apparatus, the second notification including detailed information regarding the service provided by the computer;

sending, from the computer, a third notification to the first information processing apparatus, via the second information processing apparatus, in response to a second request from the first information processing apparatus, the third notification including information indicating that the first information processing apparatus has been registered for the service provided by the computer and the second information processing apparatus isolating the computer and the first information processing apparatus such that communication between the computer and the first information processing apparatus is enabled only as indirect communication until at least the first information processing apparatus has been registered for the service provided by the computer; and sending, from the computer, a fourth notification to the first information processing apparatus, via the second information processing apparatus, in response to a third request from the first information processing apparatus, the fourth notification including connection information enabling the first information processing apparatus that has been registered to directly connect to the computer without connecting to the second information processing apparatus;

receiving, at the first information processing apparatus, the identification information from the computer via the second information processing apparatus;

requesting, at the first information processing apparatus and via the second information processing apparatus, that the computer send detailed information regarding the service provided by the computer;

requesting, at the first information processing apparatus and via the second information processing apparatus, that the computer register the first information processing apparatus for the service provided by the computer;

sending, from the first information processing apparatus, information regarding use of the service provided by the computer, to the computer via the second information processing apparatus; and receiving, at the first information processing apparatus, connection information for connecting to the computer without connecting to the second information processing apparatus, from the computer via the second information processing apparatus, the computer, the first information processing apparatus, and the second information processing apparatus being distinct apparatuses.

15. An information processing method for an information processing apparatus for exchanging information with first information processing apparatus via a network, the information processing method comprising:

sending, from the information processing apparatus, a notification to the first information processing apparatus, via second information processing apparatus on the network, the notification including identification information for identifying a service provided by the information processing apparatus;

sending, from the information processing apparatus, a second notification to the first information processing apparatus, via the second information processing apparatus, in response to a first request from the first information processing apparatus, the second notification including detailed information regarding the service provided by the information processing apparatus;

sending, from the information processing apparatus, a third notification to the first information processing apparatus in response to a second request from the first information processing apparatus, the third notification including information indicating that the first information processing apparatus has been registered for the service provided by the information processing apparatus and the second information processing apparatus isolating the information processing apparatus and the first information processing apparatus such that communication between the information processing apparatus and the first information processing apparatus is enabled only as indirect communication until at least the first information processing apparatus has been registered for the service provided by the information processing apparatus; and sending, from the information processing apparatus, a fourth notification to the first information processing apparatus, via the second information processing apparatus, in response to a third request from the first information processing apparatus, the fourth notification including connection information enabling the first another information processing apparatus that has been registered to directly connect to the information processing apparatus without connecting to the second information processing apparatus;

receiving, at the first information processing apparatus, the identification information from the information processing apparatus via the second information processing apparatus;

requesting, at the first information processing apparatus and via the second information processing apparatus, that the information processing apparatus send detailed information regarding the service provided by the information processing apparatus;

requesting, at the first information processing apparatus and via the second information processing apparatus, that the information processing apparatus register the first information processing apparatus for the service provided by the information processing apparatus;

sending, from the first information processing apparatus, information regarding use of the service provided by the information processing apparatus, to the information processing apparatus via the second information processing apparatus; and receiving, at the first information processing apparatus, connection information for connecting to the information processing apparatus without connecting to the second information processing apparatus, from the information processing apparatus via the second information processing apparatus, the information processing apparatus, the first information processing apparatus, and the second information processing apparatus being distinct apparatuses.

16. An information processing system, comprising:

an apparatus for exchanging information with a first information processing apparatus via a network, the information processing apparatus comprising:

first notifying means for sending, from the information processing apparatus, a notification to the first information processing apparatus, via second information processing apparatus on the network, the notification including identification information for identifying a service provided by the information processing apparatus;

second notifying means for sending, from the information processing apparatus, a second notification to the first information processing apparatus, via the second information processing apparatus, in response to a first request from the first information processing apparatus, the second notification including detailed information regarding the service provided by the information processing apparatus;

third notifying means for sending, from the information processing apparatus, a third notification to the first information processing apparatus, in response to a second request from the first information processing apparatus, the third notification including information indicating that the first information processing apparatus has been registered for the service provided by the information processing apparatus and the second information processing apparatus isolating the information processing apparatus and the first information processing apparatus such that communication between the information processing apparatus and the first information processing apparatus is enabled only as indirect communication until at least the first information processing apparatus has been registered for the service provided by the information processing apparatus, and for sending, from the information processing apparatus, a fourth notification to the first information processing apparatus, via the second information processing apparatus, in response to a third request from the first information processing apparatus, the fourth notification including connection information enabling the first another information processing apparatus that has been registered to directly connect to the information processing apparatus without connecting to the second information processing apparatus;

the first information processing apparatus comprising:

first receiving means for receiving the identification information from the information processing apparatus via the second information processing apparatus;

first requesting means for requesting, via the second information processing apparatus, that the information processing apparatus send detailed information regarding the service provided by the information processing apparatus;

second requesting means for requesting, via the second information processing apparatus, that the information processing apparatus register the first information processing apparatus for the service provided by the information processing apparatus;

sending means for sending information regarding use of the service provided by the information processing apparatus, to the information processing apparatus via the second information processing apparatus; and second receiving means for receiving connection information for connecting to the information processing apparatus without connecting to the second information processing apparatus, from the information processing apparatus via the second information processing apparatus; and wherein the information processing apparatus, the first information processing apparatus, and the second information processing apparatus are distinct apparatuses.

* * * * *